(12) United States Patent
Wyse

(10) Patent No.: US 6,792,421 B2
(45) Date of Patent: Sep. 14, 2004

(54) SYSTEM AND METHOD FOR RETRIEVING LOCATION-QUALIFIED SITE DATA

(75) Inventor: James Edmund Wyse, St. John's (CA)

(73) Assignee: Genesis Group Inc., St. John's (CA)

(*) Notice: Subject to any disclaimer, the term of this patent is extended or adjusted under 35 U.S.C. 154(b) by 254 days.

(21) Appl. No.: 09/927,502

(22) Filed: Aug. 13, 2001

(65) Prior Publication Data

US 2003/0033273 A1 Feb. 13, 2003

(51) Int. Cl.[7] .............................................. G06F 17/30
(52) U.S. Cl. .................................................... 707/4
(58) Field of Search ..................... 707/4, 6, 1; 382/294, 382/298; 345/419; 709/223

(56) References Cited

U.S. PATENT DOCUMENTS

| | | | | |
|---|---|---|---|---|
| 5,818,977 A | * | 10/1998 | Tansley | 382/294 |
| 6,005,988 A | * | 12/1999 | Schroeder | 382/298 |
| 6,021,406 A | * | 2/2000 | Kuznetsov | 707/6 |
| 6,108,650 A | | 8/2000 | Musk et al. | 707/4 |
| 6,222,482 B1 | | 4/2001 | Gueziec | 342/357.08 |

OTHER PUBLICATIONS

De Floriani et al., "Spatial queries and data models", Information Theory: A Theoretical Basis for GIS, p. 113–138, www.citeseer.nj.nec.com/defloriani93spatial.html.
Guting, Ralf Hartmut, "An Introduction to Spatial Database Systems", VLDB Journal: Special Issue On Spatial Databases, vol. 3, No. 4, Oct. 1994, p. 357–399, www.informatik.unitrier.de/~ley/db/journals/vldb/Guting94.html.
Freytag, Johann–Christoph et al., "Implementing Geospatial Operations in an Object–Relational Database System", Scientific and Statistical Database Managment, 2000. Proceedings. 12th International Conference on Berlin, Germany Jul. 26–28, 2000, Los Alamitos, CA, USA, IEEE Comput. Soc, US., p. 209–219.

Nievergelt, J. et al., "The Grid File: An Adaptable, Symmetric Multikey File Structure", ACM Transactions on Database Systems, Association for Computing Machinery. New York, US, vol. 9, No. 1, Mar. 1, 1984, p. 38–71.

Nievergelt, J. et al., "Chapter 6. Spatial Data Structures: Concepts and Design Choices", Algorithmic Foundations of Geographic Information Systems, 1997, p. 153–197.

Cawsey, Alison, "Range Searching" (1998), cee.hw.ac.uk/~alison/ds98/node117.html.

Lee, Dr. T., *Algorithms and Theory of Computation handbook* (1999), pp. 20–22, 20–23.

Samet, Hanan, *Applications of Special Data Structures: Computer Graphics, Image Processing, and GIS* (1990), pp. 228–229, Addison–Wesley Publishing Company.

* cited by examiner

*Primary Examiner*—Safet Metjahic
*Assistant Examiner*—Etienne P LeRoux
(74) *Attorney, Agent, or Firm*—Bereskin & Parr

(57) ABSTRACT

The present invention is directed to the use of linkcells in retrieving site data pertaining to one or more sites from a site data repository. The linkcells facilitate the resolution of several types of queries, including queries to determine a specified number of closest sites to a user's location and queries to determine sites located with a specified distance of the user's location. In one aspect, the present invention relates to a linkcell having a cell perimeter that comprises one or more cell boundary sections, a cell identifier, and a link to a data table, where one or more sites are associated with the linkcell, and where site data pertaining to those sites is stored in the data table. The cell identifier may be a name derived from the coordinates of sites associated with the linkcell. Advantageously, it is not typically necessary to examine data on all sites in the site data repository to resolve queries if linkcells are used.

17 Claims, 19 Drawing Sheets

N - Query returns {$S_2$ at $d_2$, $S_3$ at $d_3$, $S_4$ at $d_4$}
Δ - Query returns {No sites within range}

N - Query returns {$S_2$ at $d_2$, $S_3$ at $d_3$, $S_4$ at $d_4$}
Δ - Query returns {No sites within range}

N - Query returns {$S_8$ at $d_8$, $S_9$ at $d_9$, $S_{10}$ at $d_{10}$}
Δ - Query returns {$S_7$ at $d_7$, $S_8$ at $d_8$, $S_9$ at $d_9$, $S_{10}$ at $d_{10}$, and $S_{11}$ at $d_{11}$}

SYSTEM AND METHOD FOR RETRIEVING LOCATION-QUALIFIED SITE DATA

FIELD OF THE INVENTION

The present invention relates to a system and method for retrieving site data, and is more particularly concerned with a system and method for retrieving location-qualified site data in response to a query.

BACKGROUND OF THE INVENTION

The economic activity attributed to electronic commerce ("e-commerce") transactions is continuing to grow at a significant rate. Associated with this growth is an increased demand for functionality and infrastructure to aid the consumer purchasing process. Search engines, theme portals, and other Internet-based functions that generate or maintain directories of products and services are becoming an increasingly integral part of a consumer's purchasing process. As consumers increase their use of Internet-based facilities, and firms increase their Internet exposure in response, the data repositories that support consumer-focused Internet-based directories are likely to experience significant growth.

Mobile commerce ("m-commerce") has emerged as a significant and growing segment of the field of e-commerce. M-commerce is increasingly the subject of application development activities and the object of escalating levels of business investment. In particular, transaction-enabling devices that serve the mobile consumer ("m-commerce user") are becoming more readily available as the number of m-commerce users continues to grow. The adoption of technologies that involve the convergence of computing platforms for handheld computing devices, wireless web connectivity, and position-determining applications is increasing among m-commerce users. Consequently, m-commerce users may expect that data repositories underlying Internet-based product and service directories will be searchable by criteria that relates to the location of products, services, or organizations, in addition to being searchable by product, service, organizational, and other criteria. Thus, an m-commerce user's location and the locations of business operations offering goods or services of interest to the user will become increasingly important in conducting and successfully concluding m-commerce transactions.

For example, the following questions typify some of the queries that may be posed by an m-commerce user. These questions require consideration of a user's location and the location of business operations or other sites of interest:

(A) Where is the nearest cash machine?

(B) Are there any golf courses within walking distance?

(C) How close is the next gas station?

(D) What restaurants are within a block or two of my office?

Each question mentions a business operation or a site of interest that can be categorized by a site category relating to a product or service (e.g. cash machines, golf courses, gas stations, and restaurants). Each question also makes reference to a user-relative distance, that is, a distance between the location of the user and the location of the business operation or site (e.g. nearest, within walking distance, next, and within a block or two). Data relating to these business operations or sites of interest, including data that can be used to identify the location of a particular business operation or site, is typically stored in a site data repository. Rapid access to the data stored in the site data repository, especially for the purpose of resolving such queries by a user, is often an important factor in evaluating the level of service realized by a client platform of an m-commerce application.

According to a traditional approach, a query of the above nature is resolved by calculating the distance between a user's location and the location of each and every business operation or site (of a specific site category, if specified) for which data is stored in the data repository. Once the distances between a user's location and the location of each business operation or site are calculated, the query could be resolved using these calculated distances, by extracting only the data pertaining to business operations or sites which satisfied the query. However, this traditional approach may be time-consuming, particularly when there is a large number of business operations or sites for which data is stored in the data repository, since the location of all business operations or sites (of a specific site category, if specified) must be considered to resolve the query.

Some prior art methods attempt to resolve similar queries in a manner that may be more efficient than this traditional approach.

U.S. Pat. No. 6,108,650 discloses a method for performing an accelerated radius search for geographic entities near a starting point. In this method, density values corresponding to a geographic area are generated. These density values may be used to modify the search radius used in a first search, and in successive searches.

U.S. Pat. No. 6,021,406 discloses a method of searching a database to find objects in a given area and to find objects nearest to a location. In this method, a geographic plane is divided into a rectangular grid of squares. The squares are then numbered in order as dictated by a space filling curve, using spatial key numbers. The space filling curve allows for the representation of a two-dimensional plane using one-dimensional coordinates. Objects on the two-dimensional plane may span multiple squares. Given the property that consecutive spatial key numbers will identify neighboring squares, the use of the space filling curve allows the squares that an object spans to be identified in groups.

SUMMARY OF THE INVENTION

The present invention relates generally to a system and method for retrieving site data.

More specifically, the present invention relates to a system and method for retrieving site data stored in a site data repository, to linkcells, and to a system and method for generating linkcells for use in retrieving site data stored in a site data repository.

One aspect of the present invention relates to a linkcell for use in retrieving site data pertaining to one or more sites of a plurality of sites in a site set, wherein each site in the site set is located in a location space, wherein site data pertaining to sites in the site set is contained in a site data repository, and wherein the linkcell comprises: a cell perimeter that defines a cell space for the linkcell within the location space, wherein said cell perimeter comprises one or more cell boundary sections, and wherein each of said one or more cell boundary sections has a predefined coordinate interval associated therewith; a cell identifier; and a link to a data table; wherein at least one site of the site set is associated with the linkcell, and wherein site data pertaining to the at least one site is stored in the data table.

Another aspect of the present invention relates to a method of generating linkcells wherein the location of a site is defined by at least two coordinates, and wherein a cell identifier is derived from the at least two coordinates, the at least two coordinates defining the location of a site associated with the linkcell to which the cell identifier is assigned.

Another aspect of the present invention relates to a method of generating linkcells for use in retrieving site data pertaining to one or more sites of a plurality of sites in a site set, wherein each site in the site set is located in a location space, wherein site data pertaining to sites in the site set is contained in a site data repository, and wherein the method comprises the steps of: partitioning the location space into a plurality of cells; associating each site in the site set with one of the plurality of cells; defining a plurality of linkcells, wherein the plurality of linkcells is a subset of cells in the plurality of cells, and wherein each of the plurality of linkcells has at least one site associated therewith; assigning a cell identifier to each of the plurality of linkcells; linking a data table to each of the plurality of linkcells; and for each of the plurality of linkcells, storing site data pertaining to all sites associated therewith in the data table linked thereto.

Another aspect of the present invention relates to a method of retrieving site data pertaining to one or more sites of a plurality of sites in a site set, wherein each site in the site set is located in a location space, wherein site data pertaining to sites in the site set is contained in a site data repository, wherein a plurality of linkcells have been generated, wherein each linkcell comprises a cell space in the location space, wherein each linkcell has at least one site associated therewith, wherein each linkcell has been assigned a cell identifier, wherein each linkcell is linked to a data table, and wherein the method comprises the steps of: receiving a user-specified cell identifier as input; retrieving site data pertaining to at least one site associated with a linkcell to which the user-specified cell identifier has been assigned; and outputting site data retrieved to a user.

Another aspect of the present invention relates to a method of retrieving site data pertaining to one or more sites of a plurality of sites in a site set, wherein each site in the site set is located in a location space, wherein the location space is partitioned into cells, wherein site data pertaining to sites in the site set is contained in a site data repository, wherein site data pertaining to sites in the site set comprises a site identifier, wherein a plurality of linkcells have been generated, wherein each linkcell comprises a cell space in the location space, wherein each linkcell has at least one site associated therewith, wherein each linkcell has been assigned a cell identifier, wherein each linkcell is linked to a data table, and wherein the method comprises the steps of: receiving a user's location; receiving a user request to retrieve site data pertaining to a specified number of sites closest to the user's location; defining a core cell, wherein the core cell is in a searchable area defined in the location space; defining a cursor cell, wherein the cursor cell traverses a path of cells in the searchable area starting with the core cell until either the cursor cell has traversed all of the searchable area or the cursor cell has traversed one or more predefined layers of cells containing at least the specified number of sites, such that each time the cursor cell is positioned at a linkcell, sites associated with that linkcell are identified and for each identified site, the site identifier therefor and the distance between the user's location and the identified site are stored in a result table; determining any additional linkcells in said searchable area that could have sites associated therewith that are closer to the user's location than any of the first-identified pre-specified number of sites; identifying sites associated with the any additional linkcells; for each site associated with the any additional linkcells, storing the site identifier therefor and the distance between the user's location and the site in a result table; determining the specified number of sites closest to the user's location from the distances stored in the result table; retrieving site data pertaining to the specified number of sites closest to the user's location; and outputting site data retrieved to a user.

Another aspect of the present invention relates to a method of retrieving site data pertaining to one or more sites of a plurality of sites in a site set, wherein each site in the site set is located in a location space, wherein the location space is partitioned into cells, wherein site data pertaining to sites in the site set is contained in a site data repository, wherein site data pertaining to sites in the site set comprises a site identifier, wherein a plurality of linkcells have been generated, wherein each linkcell comprises a cell space in the location space, wherein each linkcell has at least one site associated therewith, wherein each linkcell has been assigned a cell identifier, wherein each linkcell is linked to a data table, and wherein the method comprises the steps of: receiving a user's location; receiving a user request to retrieve site data pertaining to sites located within a user-specified distance of the user's location; defining a core cell, wherein the core cell is in a searchable area defined in the location space; defining a cursor cell, wherein the cursor cell traverses a path of cells in the searchable area starting with the core cell until either the cursor cell has traversed all of the searchable area or the cursor cell has traversed an area covering all points in the searchable area that are within the specified distance of the user's location, such that each time when the cursor cell is positioned at a linkcell, sites associated with that linkcell are identified and for each identified site, the site identifier therefor and the distance between the user's location and the identified site are stored in a result table; determining the sites within a user-specified distance to the user's location from the distances stored in the result table; retrieving site data pertaining to the sites within a user-specified distance to the user's location; and outputting site data retrieved to a user.

Another aspect of the invention relates to a system for retrieving site data pertaining to one or more sites of a plurality of sites in a site set, wherein each site in the site set is located in a location space, wherein the location space is partitioned into cells, wherein site data pertaining to sites in the site set comprises a site identifier, the system comprising: a site data repository, wherein site data pertaining to sites in the site set is contained in the site data repository; a storage means for storing data tables; a user interface; and one or more processing modules connected to the site data repository, the storage means, and the user interface, wherein the processing modules are programmed to perform the steps of a method of an embodiment of the present invention.

The present invention is directed to the use of linkcells in retrieving site data pertaining to one or more sites from a site data repository. The linkcells facilitate the resolution of several types of queries, including queries to determine a specified number of closest sites (of one or more specific site categories, if desired) to a user's location, and queries to determine sites (of one or more specific site categories, if desired) located within a specified distance of the user's location, for example.

In an embodiment of the present invention, a linkcell is assigned a name derived from the coordinates of sites associated with the linkcell. Advantageously, in this embodiment, the coordinates of any site to which site data stored in the site data repository pertains provide all the information needed to uniquely identify the linkcell with which that site is associated. The name assigned to a linkcell also provides a unique reference to a section of a location space containing sites for which site data is stored in the site data repository.

Advantageously, these linkcells provide a means for resolving some queries more efficiently than a traditional approach, at least for some sizes of site data repositories.

BRIEF DESCRIPTION OF THE DRAWINGS

For a better understanding of the present invention, and to show more clearly how it may be carried into effect, reference will now be made, by way of example, to the accompanying drawings used to aid in the description of preferred embodiments of the present invention, and in which.

Figure 1A:
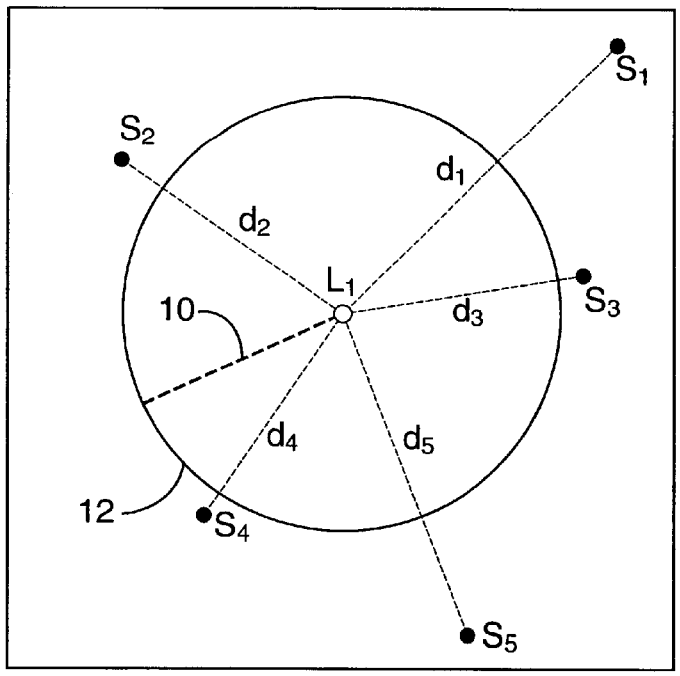
FIGS. 1A and 1B are diagrams illustrating examples of the results of an N-query and a Δ-query.

Similar references are used in different figures to denote similar components.

DETAILED DESCRIPTION OF THE PREFERRED EMBODIMENTS

The present invention relates generally to a system and method for retrieving site data.

More specifically, the present invention is directed to the use of a construct referred to herein as a linkcell, constructed and generated in accordance with the present invention, in retrieving site data pertaining to one or more sites from a site data repository in which the site data is stored. The site data may be referred to as "location-qualified", since such site data will comprise data capable of defining the location of the site to which the site data pertains on a coordinate system. While the preferred embodiments of the present invention are described herein with respect to a two-dimensional coordinate system, the present invention may also be applied to coordinate systems of higher dimensions.

Linkcells of the present invention facilitate the resolution of several types of queries, particularly certain queries that require knowledge of a user's location relative to the location of some object or entity, such as a business operation or site. For example, linkcells can be used to facilitate the resolution of the following two query types:

(1) an unbounded query (which may be identified by the use of terms such as "nearest" and "next", for example); and (2) a bounded query (which may be identified by the use of term such as "within walking distance" and "within a block or two", for example).

The essential distinction between bounded and unbounded queries is that an unbounded query places no search range limit on a search procedure that searches for sites to which site data stored in a site data repository pertains. On the other hand, a bounded query imposes a specified search range limit that is relevant to the query on the search procedure.

For example, queries which use terms such as "nearest" or "next" that do not place any restriction on a site's distance from a user's location is considered to be an unbounded query, whereas queries which use terms to query a site data repository about sites within a specified distance of a user's location is considered to be a bounded query.

These two types of queries can be more generally associated with the following formal user requests:

(1) a request to locate the N sites nearest a user's location (N is an integer), and (2) a request to locate sites that are within a specified distance Δ of a user's location.

Site data pertaining to a site stored in a site data repository may also comprise a site category (e.g. using a site category identifier) associated with the site. The site category can relate to a specific product or service (e.g. cash machines, golf courses, gas stations, restaurants, etc.). Accordingly, where queries also make reference to a site category, the formal user requests can be more specifically formulated as follows:

(1) a request to locate the N sites of a specific (e.g. user-specified) site category nearest a user's location, and (2) a request to locate sites of a specific (e.g. user-specified) site category that are within a specified distance Δ of a user's location.

Alternatively, the above formulation of formal user requests may also be further modified to address the locating of sites of any number of a group of specified site categories. It will also be obvious to persons skilled in the art that more than one site category may also be associated with a site.

The unbounded query implied by the former of each pair of formal user requests formulated above may be referred to as an "N-query", while the bounded query implied by the latter of each pair of formal user requests may be referred to as a "Δ-query".

Figure 1B:
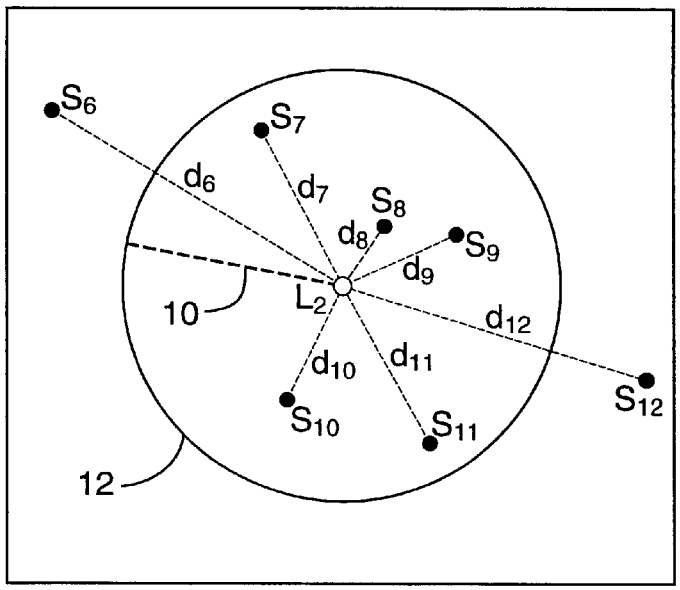

Referring now to FIGS. 1A and 1B, diagrams illustrating examples of the results returned in the resolution of an N-query and a Δ-query on a sample site set for two different user locations $L_1$ (FIG. 1A) and $L_2$ (FIG. 1B).

Both queries use a site data repository containing location-qualified site data on sites $S_1$ through $S_{12}$. For simplicity, all sites are assumed to be in the same site category for this example (i.e. the site data pertaining to all sites $S_1$ through $S_{12}$ comprises the same site category identifier). When the user is located at $L_1$, an N-query about the "nearest" sites when N=3 should return {site $S_2$ at distance $d_2$, site $S_3$ at distance $d_3$, and site $S_4$ at distance $d_4$} while a $\Delta$-query about "nearby" sites within a distance of $\Delta$ (i.e. the distance defined by radius 10 of range circle 12) should return {No sites within range}. At $L_2$, the same N-query about the "nearest" sites should return {$S_8$ at $d_8$, $S_9$ at $d_9$, and $S_{10}$ at $d_{10}$} while the same $\Delta$-query about "nearby" sites should return {$S_7$ at $d_7$, $S_8$ at $d_8$, $S_8$ at $d_9$, $S_{10}$ at $d_{10}$, and $S_{11}$, at $d_{11}$}. Any method of retrieving site data pertaining to one or more sites in a site set used to resolve either an N-query or a $\Delta$-query against a site data repository of site data must yield results consistent with those illustrated in FIGS. 1A and 1B.

Figure 2:
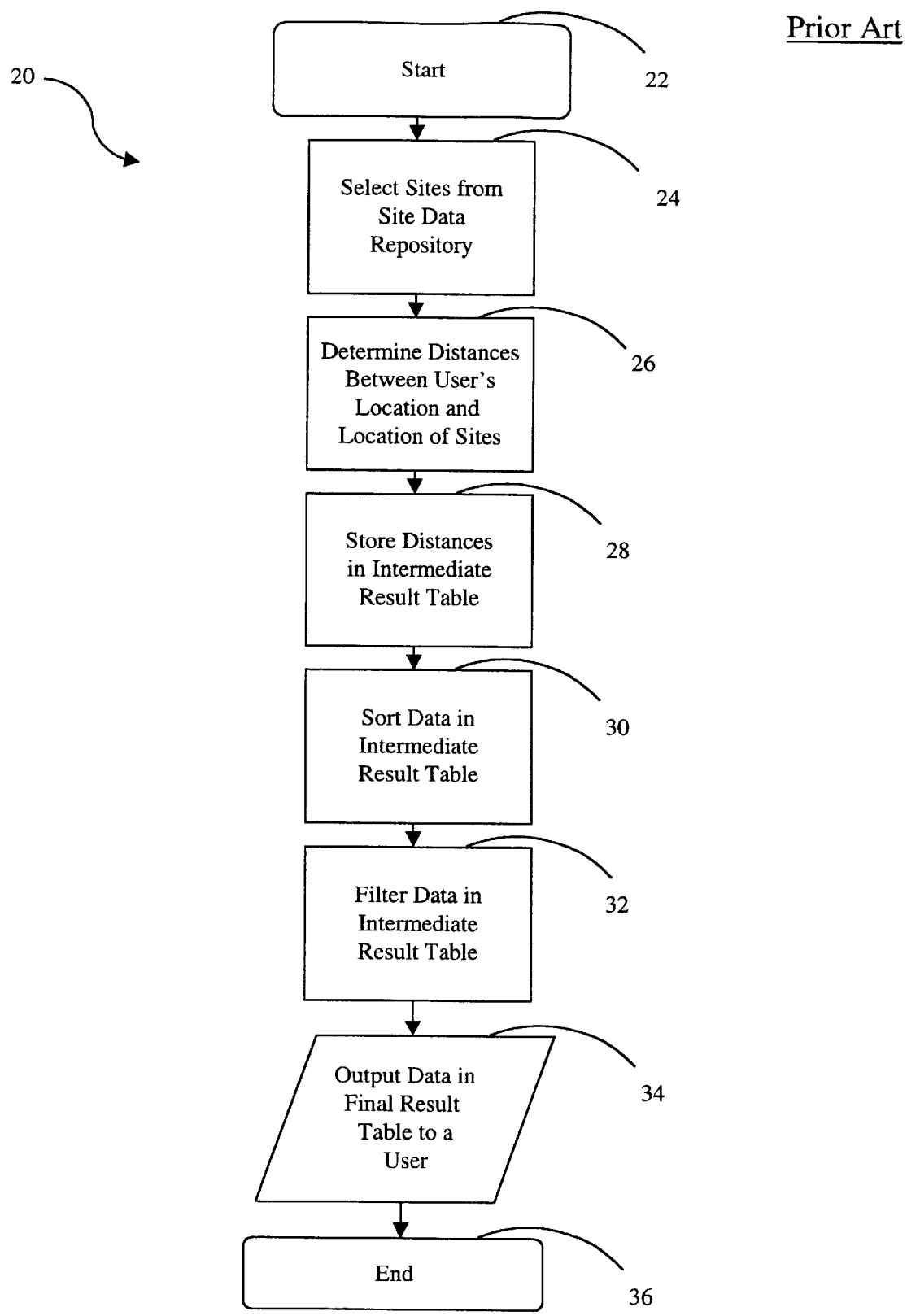
FIG. 2 is a flowchart illustrating the steps in a method of retrieving site data according to a traditional approach.

FIG. 2 is a flowchart illustrating the steps in a method of retrieving site data according to a traditional approach shown generally as 20. This traditional approach is derived from a technique for processing queries, such as N-queries and $\Delta$-queries, against a site data repository. This traditional approach does not require any special prior repository preparation. Method 20 can be used to process both N-queries and $\Delta$-queries using the same general procedure. Method 20 is not considered to be "location-aware" since there are no procedural variations arising from either the location of the user or the location of the sites targeted by a query.

Method 20 commences at step 22. At step 24, sites to which site data stored in a site data repository pertains are selected for consideration. If a query makes reference to a user-specified site category, only sites with which the user-specified site category is associated are selected for consideration.

At step 26, using the coordinates of each of the locations of the sites selected for consideration at step 24 and the coordinates of a user's location, the user-relative distance between the user's location and the location of each selected site is determined.

At step 28, the user-relative distances determined at step 26 are stored in an intermediate result table. Site identifiers are also stored in the intermediate result table, which associates those site identifiers with their respective user-relative distances.

At step 30, data in the intermediate result table is then sorted in ascending order by distance.

At step 32, data in the intermediate result table is filtered in a manner that depends on the type of query being resolved. If the query being resolved is an N-query, data is filtered from the intermediate result table such that only data associated with the first N sites in the intermediate result table sorted at step 30 is retained. If the query is a $\Delta$-query, data is filtered from the intermediate result table such that only data associated with sites for which a user-relative distance does not exceed $\Delta$ are retained.

At step 34, data in a final result table may be output to a user. The data pertaining to sites in the intermediate result table can be combined with the site data in the site data repository (e.g. using the site identifiers of a site as links to site data pertaining to the sites stored in the site data repository) in constructing the final result table. This data can then be delivered to the user through a client platform of an m-commerce application.

Step 36 marks the end of the method of retrieving site data according to a traditional approach.

This traditional approach may be time-consuming for certain queries and for certain site data repository sizes since all sites to which data stored in the site data repository pertains (of a specific site category, if specified) and their locations must be considered before a query is resolved. The present invention is directed to a system and method that resolves some queries more efficiently than this traditional approach, at least for some sizes of site data repositories.

Figure 3:
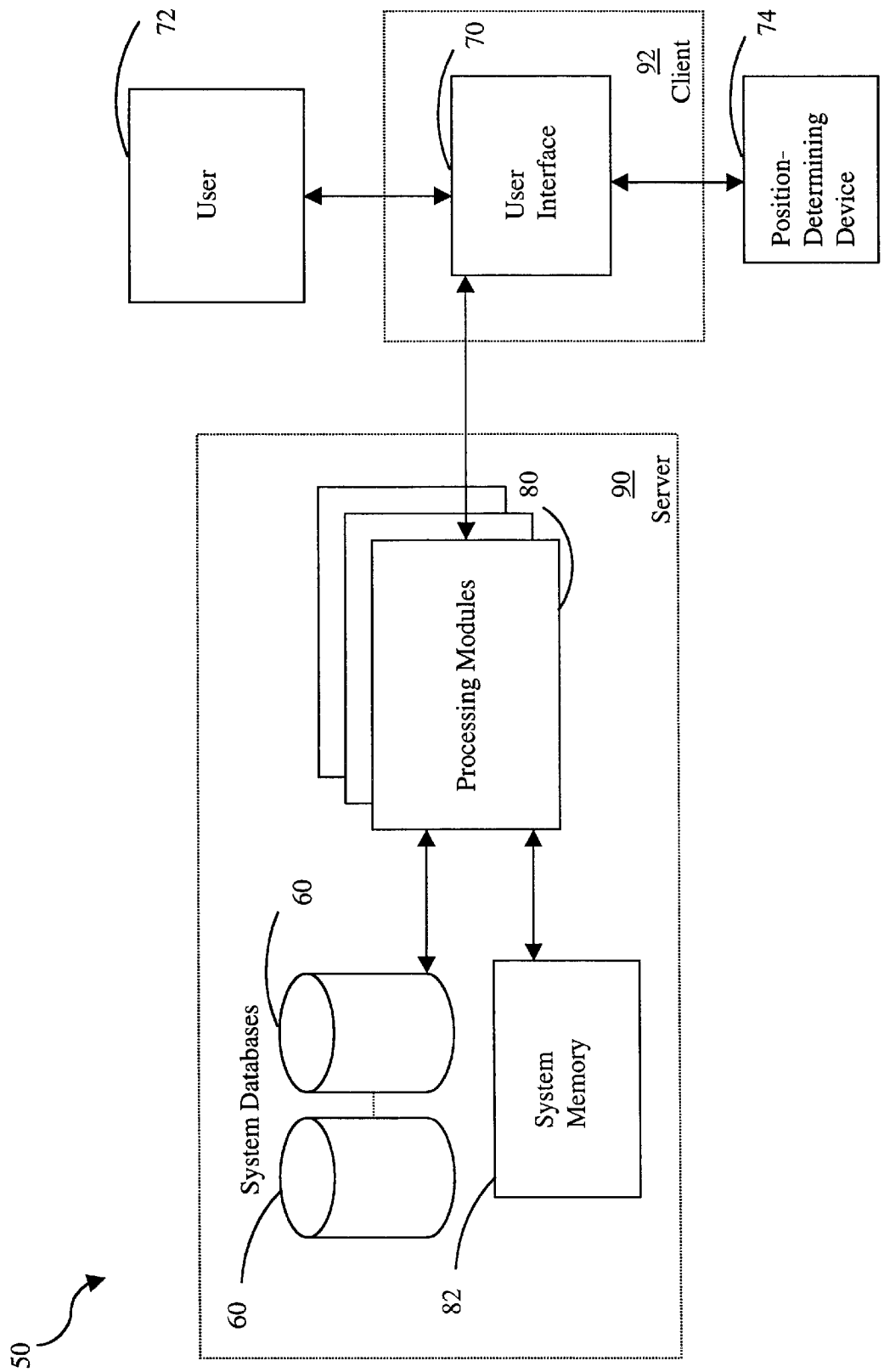
FIG. 3 is a schematic diagram illustrating components of a system in a preferred embodiment of the present invention.

FIG. 3 is a schematic diagram illustrating components of a system in a preferred embodiment of the present invention shown generally as 50. System 50 comprises one or more databases 60, a user interface 70, and one or more processing modules 80.

In this embodiment of the invention, system databases 60 are used to house the site data repository that contains site data pertaining to sites in a site set, and can be accessed by the processing modules 80. Processing modules 80 are programmed to implement one or more of the methods of an embodiment of the present invention. In variant embodiments of the invention, instructions performed by processing modules 80 may also be stored on a computer-readable medium.

Input data may be entered into the system by a user 72, using a user interface 70. Input data may include, for example, an indication of the location of user 72, the type of query posed by user 72 (e.g. N-query, $\Delta$-query), a specified number N for an N-query, a specified distance $\Delta$ for a $\Delta$-query, a specified site category or site category identifier, or other data. While this input data may be entered by a user 72, some of the input data may be pre-determined in the system 50 (e.g. as default values), or may be provided from some other data source, including for example, a position-determining device 74 (e.g. a GPS device that provides an indication of the location of user 72).

System databases 60 are used to store data tables that are linked to linkcells of the present invention. Alternatively, system 50 may also comprise a system memory 82 accessible by processing modules 80 for storing data tables that are linked to linkcells of the present invention. While these are some examples of storage means for storing data tables, other storage means may also be employed, including for example, one or more memories, one or more databases, one or more storage devices, or any combination of the above.

Databases 60, processing modules 80, and system memory 82 may reside on a server 90, while user interface 70 may reside on a client computing device 92, although other configurations of the system 50 are possible. As one skilled in the art will recognize, any of the components of system 50 may be distributed across a plurality of computing servers or systems as chosen by an implementer of the present invention for performance, security, robustness, or other reasons.

Figure 4:
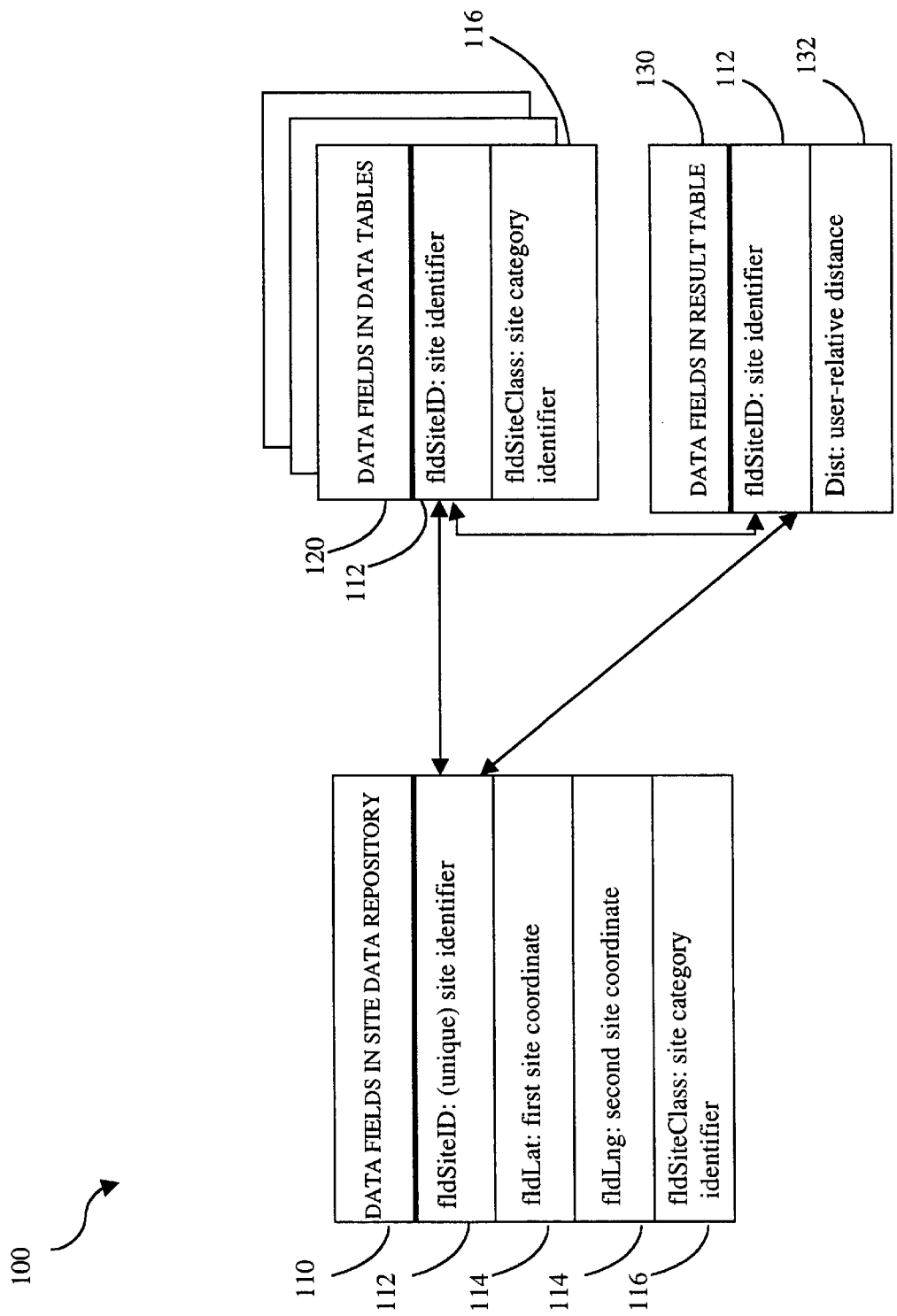
FIG. 4 is a diagram of a data entity structure utilized in a preferred embodiment of the present invention.

FIG. 4 is a diagram of a data entity structure utilized in a preferred embodiment of the present invention shown generally as 100.

In this embodiment, site data repository 110 resides on system databases 60 (FIG. 3). Data records of site data repository 110 comprise fields for a site identifier 112 that uniquely identifies a site in a site set, and two or more coordinates 114 that define the location of a site in a site set. Optionally, data records of site data repository 110 may also comprise a field for a site category identifier 116 that associates a site in a site set with some predetermined category or classification, typically related to a type of product or service. Data records of site data repository 110 may also comprise additional site category identifiers 116, or any other fields for data relating to sites in a site set.

In this embodiment of the invention, one or more data tables 120 also reside in system databases 60 (FIG. 3). As detailed below, the invention provides a plurality of linkcells, and a data table 120 is linked to each linkcell [not shown in FIG. 4] of the present invention. Data records of data table 120 comprise a field for site identifiers 112 of sites associated with the linkcell to which data table 120 is linked. Optionally, data records of data table 120 may also comprise a field for a site category identifier 116 that associates a site, associated with the linkcell to which data table 120 is linked, with some predetermined category or classification. Data table 120 may also be assigned a cell identifier or name that may be used to determine the linkcell to which data table 120 is linked. Data records of data table 120 may comprise other fields for data associated with the linkcell to which data table 120 is linked.

Data table 120 may also be designed to allow all site data in site data repository 110 pertaining to a linkcell to which data table 120 is linked to be saved therein. However, more preferably, one or more links to the site data stored in site data repository 110 (e.g. using a site identifier 112) is stored in data table 120. Advantageously, this permits access to site data stored in site data repository 110 without requiring all site data of interest to be copied into a data table 120.

In processing and resolving queries, a result table 130 will be used to store data pertaining to located sites. Result table 130 preferably resides in system memory 82 (FIG. 3), but may reside in other storage means. Result table 130 may also be generated only temporarily in the process of resolving a query. Data records of result table 130 comprise fields for a site identifier 112 of a site, and a user-relative distance 132 for storing the distance between a user's location and the site. Data records of data tables 120 may also comprise other fields.

The linkcell construct will now be discussed in detail, first with reference to FIG. 5.

Figure 5:
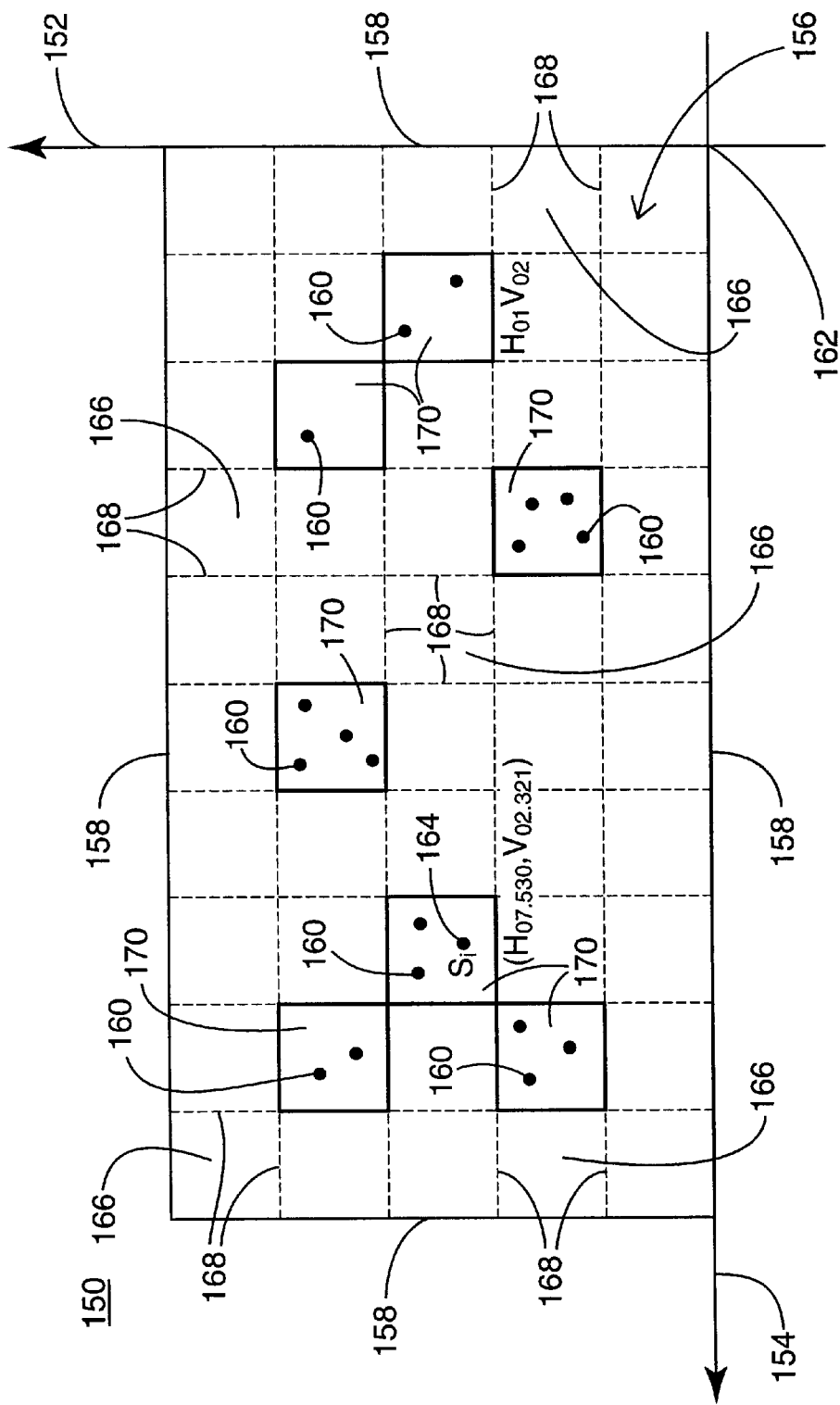
FIG. 5 is a diagram illustrating an example of sites and linkcells in a location space.

Referring to FIG. 5, a diagram illustrating an example of sites and linkcells in a location space is shown. In FIG. 5, sites to which site data contained in a site data repository pertains are graphically represented in a coordinate system 150. FIG. 5 illustrates sites and linkcells located in a two-dimensional coordinate system 150 having a vertical axis 152 and a horizontal axis 154 as an example only. However, in variant embodiments of the invention, coordinate systems of fewer or greater dimensions and other layouts may also be supported.

A location space 156 can be defined on coordinate system 150. Location space 156 can be any space on coordinate system 150 that contains every site 160 of a site set to which site data contained in a site data repository pertains. Location space 156 is defined by a location space perimeter that comprises one or more location space boundary sections 158.

While coordinate system 150 might span an infinite space, location space 156 is finite. Furthermore, while location space 156 is shown as being two-dimensional in FIG. 5, location space 156 may be of fewer or greater dimensions in variant embodiments of the present invention.

In some applications, it may even be appropriate to define a location space 156 of a different dimension than the coordinate system 150, as long as the location space 156 contains every site 160 of a site set to which site data contained in a site data repository pertains. A site set typically comprises all sites to which site data contained in a site data repository pertains. However, in some implementations of the present invention, a user may wish to remove (e.g. pre-filter) from consideration site data pertaining to certain sites in the site data repository prior to an application of the present invention.

In the layout of this example, each site 160 is positioned in location space 156 on coordinate system 150 using horizontal and vertical coordinates. In this example, the origin of coordinate system 150 is mapped to the lower rightmost corner 162 of location space 156, and consistent with commonly used map projection techniques, the horizontal coordinate (perhaps counter-intuitively) increases from right to left while the vertical coordinate increases from bottom to top. For example, site 164 labeled $S_i$ is shown at horizontal coordinate $H_{07.530}$ and vertical coordinate $V_{02.321}$. However, other mapping and coordinate schemes may be used.

In a preferred embodiment of the invention, location space 156 is partitioned (conceptually) into cells 166, where each cell 166 will have a cell perimeter that comprises one or more cell boundary sections 168. Cell boundary sections 168 define a cell space for the cell 166 within the location space 156. Each cell boundary section 168 will have a predetermined coordinate interval associated with it, and preferably (but not necessarily), all cell boundary sections 168 will have the same predetermined coordinate interval associated with it. For example, the coordinate interval may be a degree of latitude (or some predetermined fraction or multiple thereof) or a degree of longitude (or some predetermined fraction or multiple thereof). Furthermore, in this particular embodiment, cell boundary sections 168 are aligned with gridlines on coordinate system 150 having whole number coordinate values.

When cells 166 are constructed in this manner, each site 160 will fall into one and only one cell 166. Each cell 166 will contain zero, one, or more sites 160. A linkcell 170 is a cell 166 that contains at least one site 160. Thus, in preferred embodiments of the present invention, a site 160 is associated with a given linkcell 170 if it is contained in that linkcell 170 (i.e. when site 160 is located within the cell space defined for the given linkcell 170), and each site 160 is associated with exactly one linkcell 170 (since each site falls into one and only one cell 166).

In some instances, a projection or transformation technique is required to map an actual physical area (e.g. a section of the Earth's surface which is not flat) onto a location space 156. For instance, even though each cell boundary section 168 of a cell may represent one degree of latitude or longitude of a geographical area, in order for the cell space to be represented as a square on a flat location space 156, a projection technique (e.g. a Mercator map projection method) is first used. If a projection technique is used to map a physical area to location space 156, it is important that whenever a distance between two objects (e.g. sites) located in location space 156 is calculated, the method used to calculate the distance must be consistent with the projection technique used (e.g. by using a formula that takes into account any distortions of the actual distance between two objects represented in location space 156); for small distances, it may often be possible to overlook any potential distortion.

In this preferred embodiment of the present invention, cells 166 are constructed to be of equal size, and have cell boundary sections 168 associated with the same coordinate interval. In variant embodiments of the invention, cells 166 may not be of the same size or even of the same shape throughout location space 156, and each cell boundary section 168 may be associated with a different coordinate interval. Furthermore, some cells 166 may have a cell perimeter consisting of a different number of cell boundary sections 168 than other cells 166 in location space 156.

A cell identifier is assigned to each linkcell 170. In accordance with the present invention, the cell identifier of a given linkcell 170 is derived from the coordinates of the sites 160 associated with that linkcell 170. The cell identifier can be a name for example, composed of a number of components, each component being associated with a coordinate of any given site 160 associated with that linkcell 170. However, different types of cell identifiers may be used in variant embodiments of the present invention.

For example, referring to FIG. 5, truncation of the fractional part of each coordinate yields a name for a linkcell 170 (e.g. $H^{01}V02$, where H and V identify a horizontal coordinate component and a vertical coordinate component respectively). The name for the linkcell 170 in which site 164 is contained, labeled $S_i$ in FIG. 5, would be H07V02. The same cell name could also be derived in the same fashion from the other two sites contained in the linkcell 170 containing site 164. Note that in this example, all name derivations for linkcells 170 produce integer values that correspond to the coordinates of the lower right corner of the linkcells 170. In formal terms, in accordance with an embodiment of the present invention, a linkcell 170 with name HnnVmm will contain all sites with horizontal coordinate values $H_{nn.0}$ through $H_{nn.999}$ ... and vertical coordinate values $V_{mm.0}$ through $V_{mm.999}$ ...

However, other naming conventions or schemes of associating sites with linkcells 170 may be used in variant embodiments of the invention. In variant embodiments of the invention, other workable cell constructions may also be based on values other than the integral values of coordinate system 150. Coordinate "tenths", for example, could also be used to construct the required cells, in which case the cell name for site 164 labeled $S_i$ would be H07.5V02.3, or alternatively H075V023 if the truncated coordinate is multiplied by a scaling factor (e.g. sufficient to make each component an integer).

Advantageously, the coordinate values of any site 160 provide all the information needed to uniquely identify a linkcell 170 with which the site 160 is associated. Furthermore, the name or cell identifier of a linkcell 170 provides a unique reference to a section of the location space 156 containing sites 160 to which site data stored in the site data repository pertains.

In preferred embodiments of the invention, linkcells 170, like the site data repository, will exist for practical procedural purposes as data tables (e.g. relational tables). Thus, linkcell 170 may be considered to be "linked" to a data table (e.g. 120 of FIG. 4). Each data table may also bear the name of the linkcell to which it is linked. An example of the types of site data that may be stored in a data table were discussed with reference to FIG. 4. The name of each data table to which a linkcell is linked can also be used to associate the data table with a specific section of the location space 156. The data table facilitates a client application view of data relating to the specific sites 160 contained in the specific section of the location space 156 (e.g. in a linkcell 170).

Multiple data tables can also be linked to a linkcell 170 to store data pertaining to different categories separately. The name given to the data table may include components relating to other data, including the categories of sites for which data in the data table are stored. For example, a data table could be named H075V023C11, where the component "C11" identifies sites belonging to a certain category, and where data pertaining to those sites are stored in the data table. By linking multiple data tables to a linkcell 170, in certain applications, the reduced size of the data tables may facilitate faster data retrieval. However, there may exist a trade-off between data retrieval efficiency and the memory or storage resources required to store the data tables.

Figure 6:
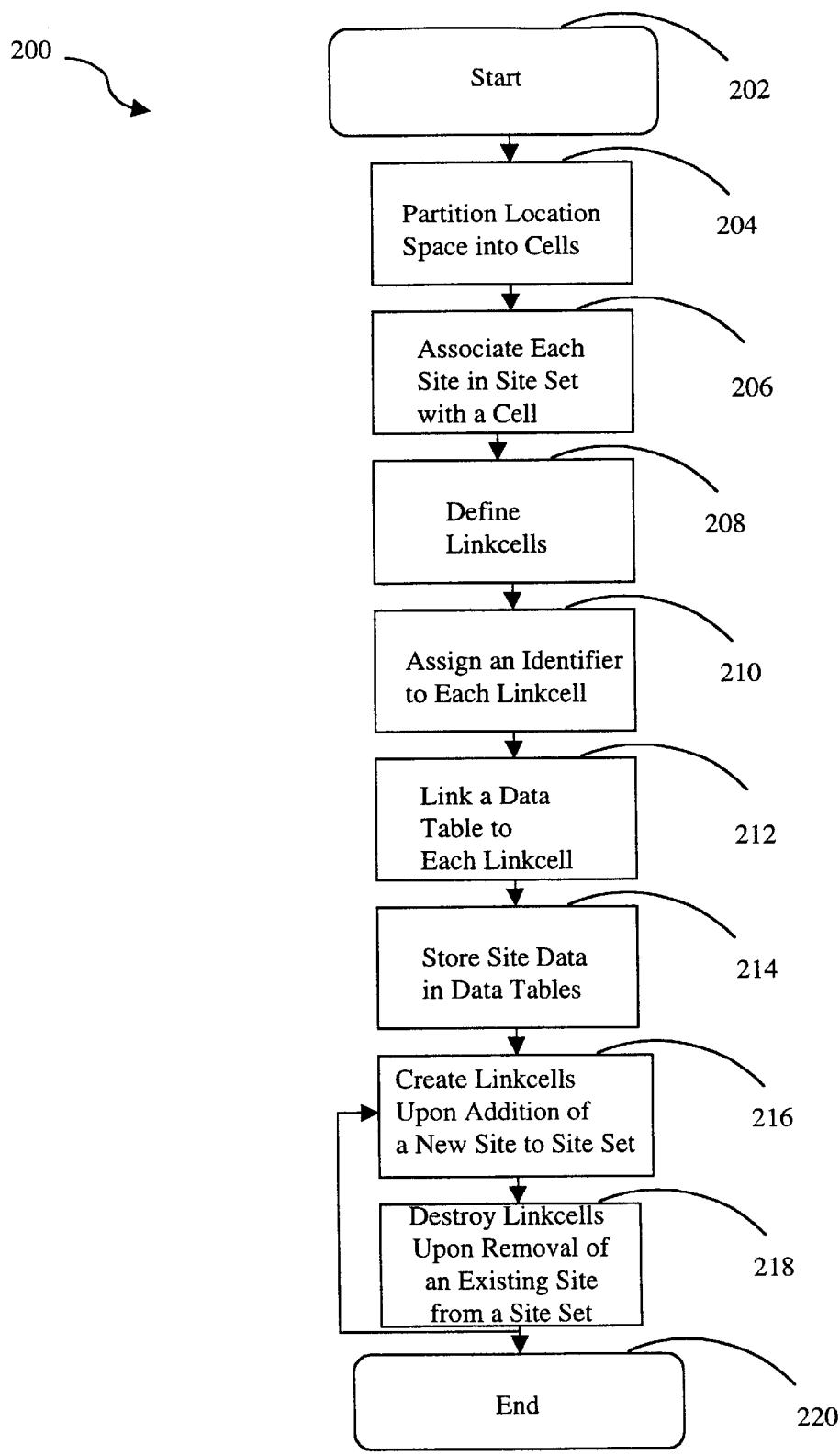
FIG. 6 is a flowchart illustrating the steps of a method of generating linkcells in a preferred embodiment of the present invention.

FIG. 6 is a flowchart illustrating the steps of a method of generating linkcells in a preferred embodiment of the present invention shown generally as 200. Method 200 may be used to generate linkcells for use in retrieving site data pertaining to one or more sites in a site set, where each site is located in a location space, and where site data pertaining to the sites in the site set is contained in a site data repository. Method 200 commences at step 202.

At step 204, a location space defined in a coordinate system is partitioned into cells (e.g. 166 of FIG. 5). Each cell comprises a cell space within the location space defined by a cell perimeter that comprises one or more cell boundary sections, with each cell boundary section having a predetermined coordinate interval associated with it. Other properties of the cell have been described with reference to FIG. 5.

At step 206, each site in the site set is associated with one of the cells created as a result of the partitioning in step 204. Preferably, each site in the site set is associated with exactly one of the cells.

At step 208, cells that can be defined as linkcells are determined. Linkcells (e.g. 170 of FIG. 5) are defined as cells that have at least one site associated with it. Most preferably, each site in the site set is associated with exactly one linkcell. Other properties of linkcells have been described with reference to FIG. 5.

At step 210, a cell identifier, such as a name as described with reference to FIG. 5, is assigned to each linkcell defined at step 208.

At step 212, a data table is linked to each linkcell defined at step 208. If necessary, step 212 may be preceded by a step where the data table is first created.

At step 214, for each given linkcell defined at step 208, desired site data pertaining to all sites associated with that linkcell is stored in the data table linked to that linkcell. Not all site data pertaining to a site stored in a site data repository is required to be saved directly in the data table. It is sufficient that a link to the data for a site stored in a site data repository, as provided by saving a unique site identifier in the data table for example, be stored in the data table. In this embodiment of the invention, a site category identifier relating to a site may also be stored in the data table.

Steps 204 through 214 are steps of method 200 that will be typically be performed once to pre-process the data in a site data repository, before linkcells are subsequently used in a method of retrieving site data from the site data repository in accordance with the present invention. Advantageously, once these pre-processing steps are performed, it is not necessary to examine data on all sites in the site data repository in response to an N-query or a Δ-query if the linkcells are used to resolve the queries. In some instances, it may be desirable to repeat steps 204 through 214 to redefine the layout or size of linkcells in a location space.

Steps 216 and 218 are performed continuously during operation of the system 50 (FIG. 3), until the program executed by programming modules 80 (FIG. 3) is terminated, in which case the flow of method steps proceeds to step 220 marking the end of method 200. Steps 216 and 218 of method 200 are directed to the dynamic maintenance of linkcells that have been generated for subsequent use in accordance with the present invention. At step 216, a new linkcell may be created upon the addition of a new site to the site set, and at step 218, an existing linkcell may be destroyed upon every removal of an existing site from a site set. However, it is not always the case that a new linkcell will be created upon every addition of a new site to the site set, nor is it always the case that an existing linkcell will be destroyed upon the removal of an existing site from a site set.

At step 216, whenever a new site is to be added to a site set, and site data pertaining to a new site is added to a site data repository, a linkcell name is derived from the coordinates of the new site. The name is used to check for the existence of a corresponding linkcell. If the linkcell exists, the site identifier and the corresponding site category identifier (and/or other information depending on the manner in which the present invention is implemented) are placed in the data table to which the linkcell is linked. If the linkcell does not exist, a data table is created (if a data table does not already exist) using the name derived from the site's coordinates, and the site's site identifier and site category identifier are placed in the newly created data table to which the linkcell is then linked. The site set will now include the new site in addition to the sites already in the site set.

At step 218, whenever an existing site is to be removed from the site set, a linkcell name is derived from the existing site's coordinates. Since site data pertaining to the site had been previously added to the site data repository, a linkcell assigned with the derived name already exists. If the site to be removed is the only remaining site in the linkcell, then the linkcell is destroyed. The name assigned to the linkcell is deleted, and the link to the data table linked to the linkcell is removed. The data table itself may also be deleted. The site data stored in the data repository pertaining to the existing site may also be removed.

However, if the linkcell contains other sites, the linkcell is not destroyed. In that event, site data pertaining to the existing site is removed from the data table linked to the linkcell. Site data pertaining to the existing site may also be removed from the site data repository.

Thus, linkcells may be created, destroyed, and modified dynamically based on changes in the composition of a site set or the content of the site data repository.

Location space boundary sections (e.g. 158 of FIG. 5) may also be dynamically changed upon the creation, destruction, and/or modification of linkcells. The location space boundary sections can be modified to ensure that all sites are within the location space (in a manner consistent with the linkcell naming convention be used), or to shrink the location space, such that the resolution of N-queries and Δ-queries may be made more efficient in some cases. For example, the location space boundary sections may be modified upon the occurrence of one of the following events: a new site is added to the site set where the new site is located outside of the location space, a specified existing site is removed from the site set where the specified existing site is located closer to one of the location space boundary sections than any other site in the site set, the location of a selected site in the site set is changed to a new location located outside of the location space, and the location of a selected site in the site set is changed to a new location from a location that is closer to one of the location space boundary sections than the location of any other site in the site set, for example.

One application of linkcells generated in accordance with the present invention is the retrieval site data for all sites associated with a specified linkcell, as specified by a user or another computing application for example.

Figure 7:
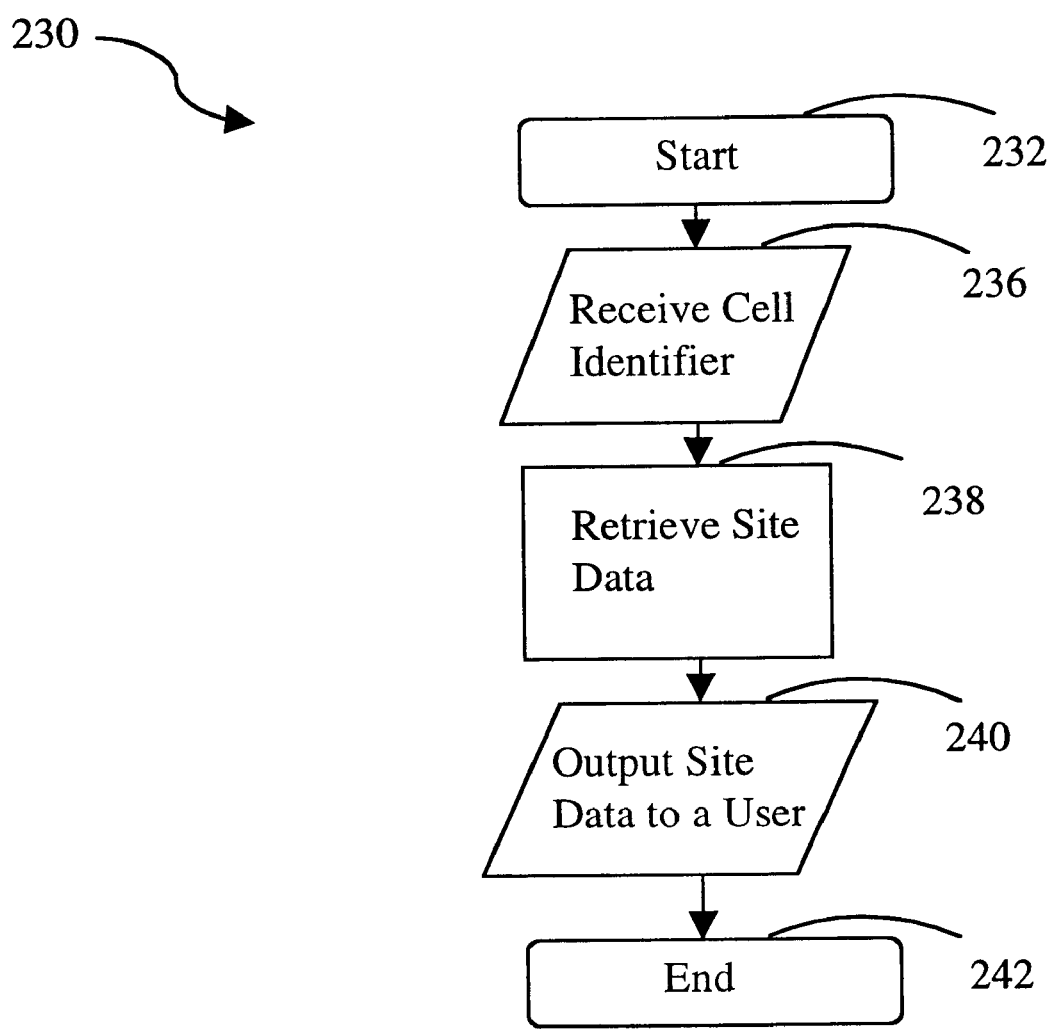
FIG. 7 is a flowchart illustrating the steps of a first method of retrieving site data in a preferred embodiment of the present invention.

FIG. 7 is a flowchart illustrating the steps of a first method of retrieving site data in a preferred embodiment of the present invention shown generally as 230. Method 230 is a method of retrieving site data pertaining to one or more sites in a site set, where each site is located in a location space, and where site data pertaining to the sites is contained in a site data repository.

To perform the steps of method 230, linkcells of the present invention must already have been generated. Each linkcell will comprise a cell space in the location space, each linkcell will have at least one site associated with it, each linkcell will have been assigned a cell identifier or name, and each linkcell will be linked to a data table. Method 230 commences at step 232.

At step 236, a user-specified cell identifier is received as input from a user. The user will typically be a person, but the user may also be another application or system. The user-specified cell identifier identifies a cell in the location space.

At step 238, if the user-specified cell identifier identifies a linkcell (which means at least one site is contained in the identified cell), site data pertaining to at least one site associated with a linkcell to which the user-specified cell identifier has been assigned is retrieved from the data table pertaining to that linkcell, and/or if the data table contains a link to site data stored in the site data repository, site data may be retrieved from the site data repository using the link. If the user-specified cell identifier does not identify a linkcell (e.g. if there are no sites contained in the identified cell), no site data is retrieved at this step.

At step 240, site data retrieved at step 238, if any, is output to a user. Step 242 marks the end of method 230.

Linkcells may also be used to resolve queries such as N-queries and Δ-queries as discussed herein. Methods of retrieving site data in response to N-queries and Δ-queries in accordance with embodiments of the present invention are described with reference to FIGS. 8 through 14.

Figure 8:
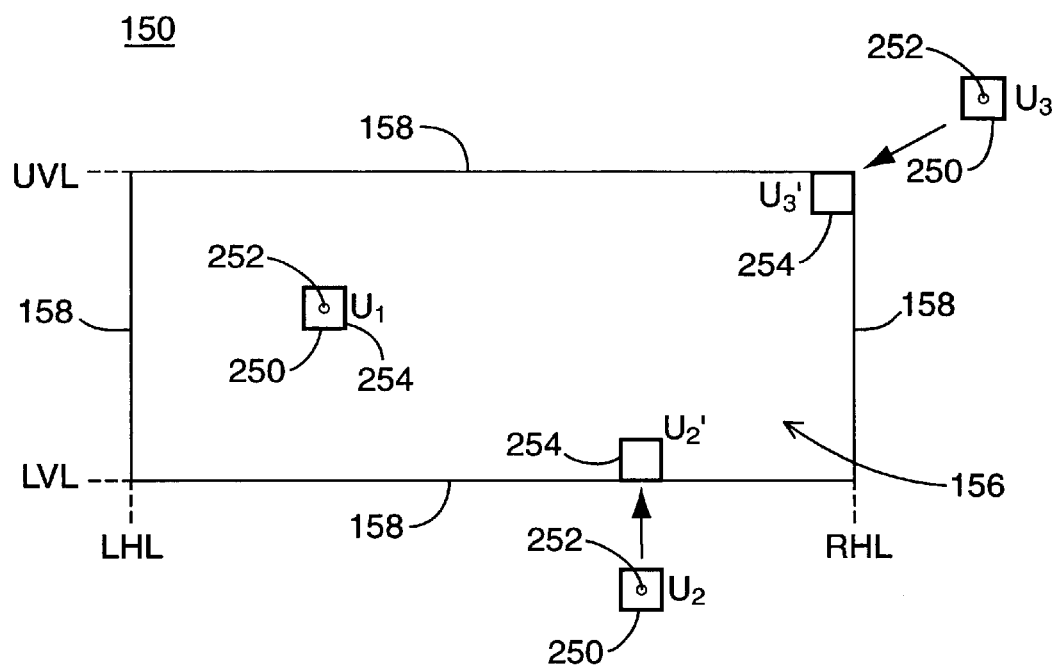
FIG. 8 is a diagram illustrating an example of user cells and linkcells in a coordinate system.

Referring to FIG. 8, a diagram illustrating an example of user cells and linkcells in a coordinate system is shown. In this example, a two-dimensional location space 156 is defined in a coordinate system 150. The two-dimensional location space 156 is defined by location space boundary sections 158. More specifically, location space 156 is defined by a pair of horizontal location space boundary sections and a pair of vertical location space boundary sections. Methods of retrieving site data in accordance with preferred embodiments of the present invention make use of the horizontal and vertical location space boundary sections 158 of location space 156 in the course of responding to both N-Queries and Δ-Queries.

Location space boundary sections 158 may be used to define four limits of a searchable area referenced by the methods: (1) a right horizontal limit (RHL), (2) a left horizontal limit (LHL), (3) a lower vertical limit (LVL) and (4) an upper vertical limit (UVL). Most preferably, all sites of interest are contained within the four limits. Accordingly, all four limits may be determined from a direct examination of repository sites either by scanning the entire site data repository or, alternatively, by comparing a site's coordinates with the four limits as each site is added to, modified in, or removed from, the site data repository, and adjusting the limits where necessary.

However, as will be apparent in the description to follow, the limits may be used to define a searchable area used in a site search for resolving queries. Preferably, the searchable area is the same as the location space, however, it is not necessary that this be the case in every implementation of the present invention. In some implementations, only sites in some portion of the location space may be of interest, in which case the searchable area may differ from the location space, and the limits defining the searchable area may differ from the location space boundary sections. Only sites of interest that is to be the subject of the site search need to be contained within the limits of the searchable area.

Methods of retrieving site data in accordance with preferred embodiments of the present invention that are used to resolve N-queries or Δ-queries typically require three types of cells to be defined: (1) a user cell 250 containing the user's location 252, (2) a core cell 254 which serves as a starting point for a site search in resolving a query, and (3) a cursor cell [not shown], which traverses a path of cells (and linkcells) during the site search. User cell 250 and core cell 254 are the same if user cell 250 is located within the limits that are, in this example, defined by the limits of the searchable area (e.g. see core cell 254 labeled $U_1$). However, when the user's location 252 is located beyond any of the horizontal and vertical limits, the core cell 254 is defined as the cell within the horizontal and vertical limits that is nearest to the user's location 252 (e.g. see user cell 250 labeled $U_2$ and core cell 254 labeled $U_2'$). As a further example, if a user's location 252 (e.g. in user cell 250 labeled $U_3$) is to the right of the right horizontal limit (RHL) and above the upper vertical limit (UVL), then core cell 254 will be defined as the cell (labeled $U_3'$) in the upper right corner of the space defined by the four limits. We have defined a user cell 250 to contain the user's location 252 for convenience; however, variant embodiments of the present invention may not utilize a user cell 250 to contain the user's location 252. Instead, in these embodiments, the user's location 250 may be referenced directly. The distinction between the user's location 250 (and user cells 250) and core cells 254 can be used to avoid searching areas in the coordinate system 150 where it is known (from the horizontal and vertical limits) that no sites exist.

In accordance with preferred embodiments of the invention, methods of retrieving site data that are used to resolve N-queries or Δ-queries employ a site search. This search procedure first requires that a core cell 254 be defined as described with reference to FIG. 8. The search procedure then begins by setting the name of the cursor cell to the name of the core cell 254 (the name of a cell is the name used to determine if the cell is a linkcell), and checking for the existence of a linkcell with the same name as the cursor cell. If the linkcell exists, its data table may be examined to identify any sites associated with the cell that have a site category identifier equal to a user-specified site category identifier, if specified. For each site identified, (1) its horizontal and vertical coordinates are retrieved (e.g. from a data table or from the site data repository), (2) its user-relative distance is determined, and (3) its site identifier and its user-relative distance are stored in a result table (e.g. as described with reference to FIG. 4).

Figure 9A:
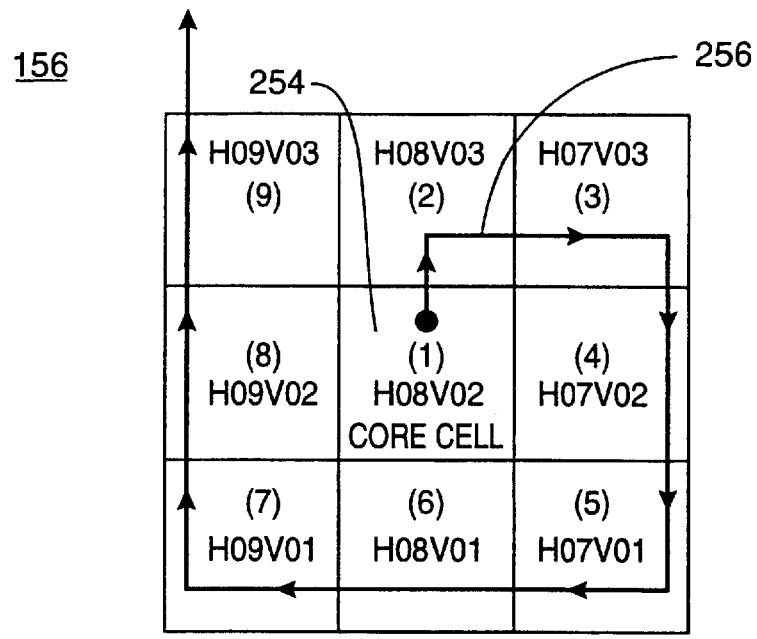
FIGS. 9A and 9B are diagrams illustrating an example of a path of cells traversed by a cursor cell.

FIG. 9A is a diagram illustrating an example of a path of cells traversed by a cursor cell. According to the search procedure, a search area in the location space 156 is expanded by generating new cursor cell names based on the name of the core cell 254 in a manner that effectively (conceptually) causes the cursor cell to traverse a path 256 of one or more predefined layers of cells (of which some cells will typically be linkcells) surrounding the core cell 254. This may be done, for example, by systematically incrementing the numeric sections of the name of the core cell 254. Preferably, the cursor cell traverses a path 256 of cells surrounding the core cell 254 in a substantially outward-spiraling fashion, either in a clockwise or counter-clockwise direction. However, any other pattern which moves the cursor cell over the entire searchable area may be used in variant embodiments of the invention.

For example, with reference to the example illustrated in FIG. 9A, if the name of the core cell 254 is H08V02, then the name of the cell (used to determine if the cell is a linkcell) immediately above the core cell 254 is H08V03. Similarly, the cell to its upper right is named H07V03 (in this example, the horizontal coordinate increases in a right-to-left fashion), the cell to its immediate right is named H07V02, and so on, around to cell named H09V03 at the core cell's upper left. Beginning with the cell positioned immediately above the core cell 254, the cursor cell is assigned cell names in a sequence that can be used to "move" the cursor cell around the core cell 254 in a clockwise pattern, for example. Whenever the cursor cell is assigned a new name, it checks for the existence of a linkcell with the cursor cell's currently assigned name. If the linkcell exists, its data table may be examined to identify any sites associated with the cell that have a site category identifier equal to a user-specified site category identifier, if specified. For each site identified, (1) its horizontal and vertical coordinates are retrieved (e.g. from a data table or from the site data repository), (2) its user-relative distance is determined, and (3) its site identifier and its user-relative distance are stored in a result table (e.g. as described with reference to FIG. 4). This results in further sites being accumulated in the result table.

Figure 9B:
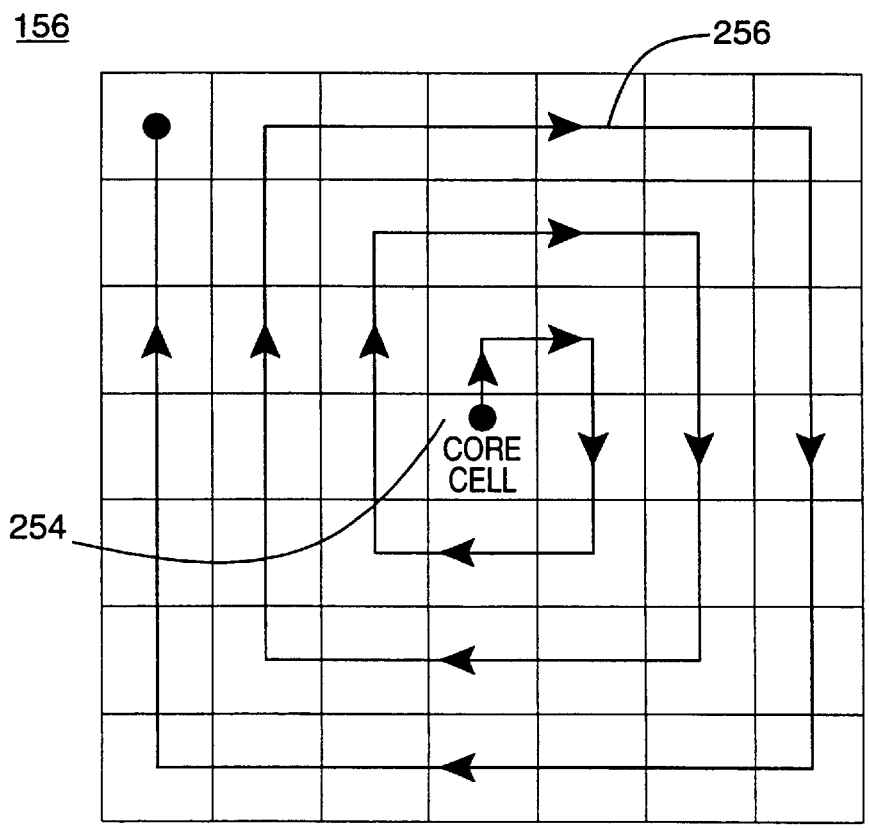

The search area is then further expanded by moving the cursor cell (e.g. clockwise) through a complete layer of cells on the outer periphery of the cells previously examined, increasing the length of the path of cells traversed by the cursor cell. As the cursor cell takes on successive names, it continuously checks for the existence of linkcells. Additional sites are then placed in the result table in a similar manner to that described above. This outward-spiraling process, clockwise-moving in this example (e.g. as shown in FIG. 9B), continues until at least N sites are found in the case of an N-query after a complete layer of cells is examined, the Δ-range limit is reached in the case of a Δ-query (as will be explained in further detail with reference to FIGS. 11 through 14), or the entire searchable area defined by horizontal and vertical limits (e.g. as discussed with reference to FIG. 8) has been searched in the case of either an N-query or a Δ-query. In a preferred embodiment of the invention, where the cursor cell moves substantially in an outward-spiraling manner either in a clockwise or counter-clockwise direction, and subject to the effect of a cursor cell encountering limits of the searchable area during a search as described below, a "layer" of cells consists of all cells that completely surround cells that have already been traversed. However, in variant embodiments of the invention where other patterns of cursor cell movement are used, a "layer" of cells may be defined differently, as desired.

Figure 10:
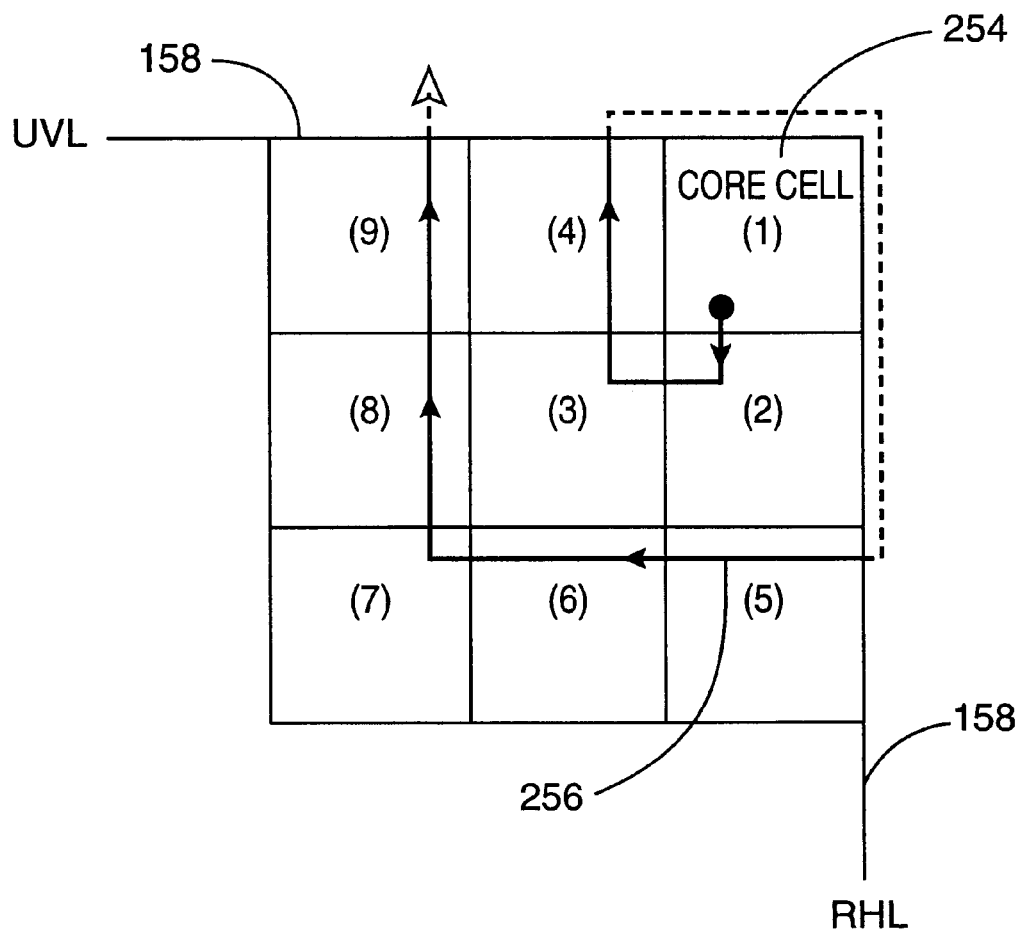
FIG. 10 is a diagram illustrating an example of the path of cells traversed by a cursor cell near limits defining a searchable area.

FIG. 10 is a diagram illustrating an example of the path of cells traversed by a cursor cell near limits that define a searchable area. The descriptions provided with reference to FIGS. 9A and 9B did not explicitly address instances when one or more of the horizontal or vertical limits are encountered in the course of a site search. FIG. 10 illustrates the path 256 of cells traversed by a cursor cell in an example where a core cell 254 is adjacent to UVL and RHL. Such situations may be accommodated, for example, by maintaining a set of movement limitation switches (e.g. Boolean variables) that indicate valid cursor cell movement directions. Whenever the cursor cell encounters a limit, the movement limitation switch associated with the limit is set, to indicate that movement of the cursor cell in a specific direction is no longer possible. For example, when the cursor cell's name places the cursor cell beyond the UVL in an area outside of the searchable area, then a "UVL movement limitation switch" is set, and indicates that a rightward sequence (when the spiraling process is in a clockwise direction) of cursor cell names is no longer permissible. Similarly, when the cursor cell's name places the cursor cell beyond the RHL in an area outside of the searchable area, then the "RHL movement limitation switch" is set, and indicates that a downward sequence (when the spiraling process is in a clockwise direction) of cursor cell names is no longer permissible. A similar procedure is followed with respect to the movement limitation switches associated with the LVL and the LHL. In any given embodiment of the present invention, the sequence of permissible cursor cell names as a cursor cell approaches the limits of a searchable area will differ depending on the manner in which the cells of the searchable area are traversed. In the example of FIG. 10, the cursor cell continues to move in an outward-spiraling, clockwise pattern. The cursor cell "skips" cells whenever a "movement limitation switch" indicates that a vertical or horizontal limit has been reached. Therefore, the actual portions of the path traversed by the cursor cell consists only of cells within the searchable area defined by its limits, and only site data pertaining to sites located within cells in the searchable area are to be stored in a result table. Accordingly, when a cursor cell approaches the limits of the searchable area, the layer of cells surrounding the core cell to be traversed will comprise all cells that completely surround cells that have already been traversed which lie strictly within the searchable area.

Figure 11:
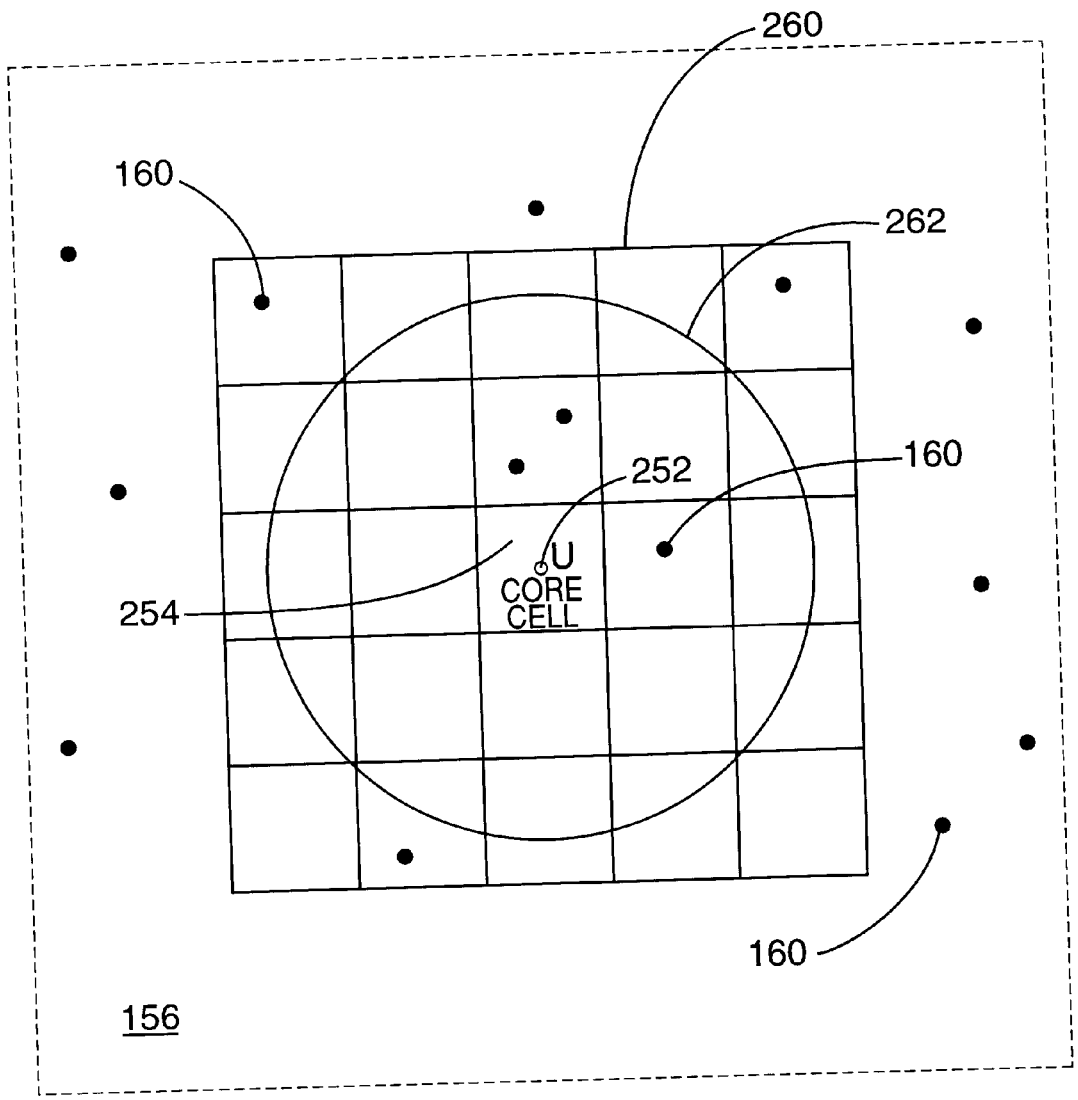
FIG. 11 is a diagram illustrating a further example of the results of a Δ-query.

Referring now to FIG. 11, a diagram illustrating a further example of the results of a Δ-query is shown. The search procedure described above, in the case of a Δ-query, will continue until the Δ-range limit is reached, or the entire searchable area has been searched. In the layout of cells in this example, this Δ-range limit is considered to be reached if all cells traversed by the cursor cell cover an area bounded by rectangle 260 that encompasses a circle 262 centered at the user's location U 252 (or a sector of the circle 262 within the searchable area if U is located outside of the searchable area), and having a radius of Δ. After the search procedure is performed, the result table, when the query being processed is a Δ-query, will contain all sites (of a user-specified site category, if specified) within a distance of Δ of the user's location 252; however, the result table may also contain sites whose user-relative distances are beyond Δ.

FIG. 11 illustrates an example of a situation where the result table for a Δ-query will contain data pertaining to sites with user-relative distances exceeding Δ. The cursor cell has assembled data in a result table from sites within a core cell-centered rectangle 260 having a height and width that, typically, will slightly exceed 2Δ. Unfortunately, sites located in extreme areas of the rectangle 260 may be included in the result table even though they are beyond the desired circular-like search area bounded by circle 262 implied by the Δ-query. To correct for this occurrence, the user-relative distance of each site (i.e. the distance from the user's location 252 to each site) in the result table is considered, and sites whose user-relative distances are less than or equal to Δ are determined. Site data pertaining to these determined sites are then retrieved from data tables and/or the site data repository. The site data may then be output to a user, for example, by producing an output table of data for delivery to a client platform running an application that initiated the Δ-query.

Figure 12:
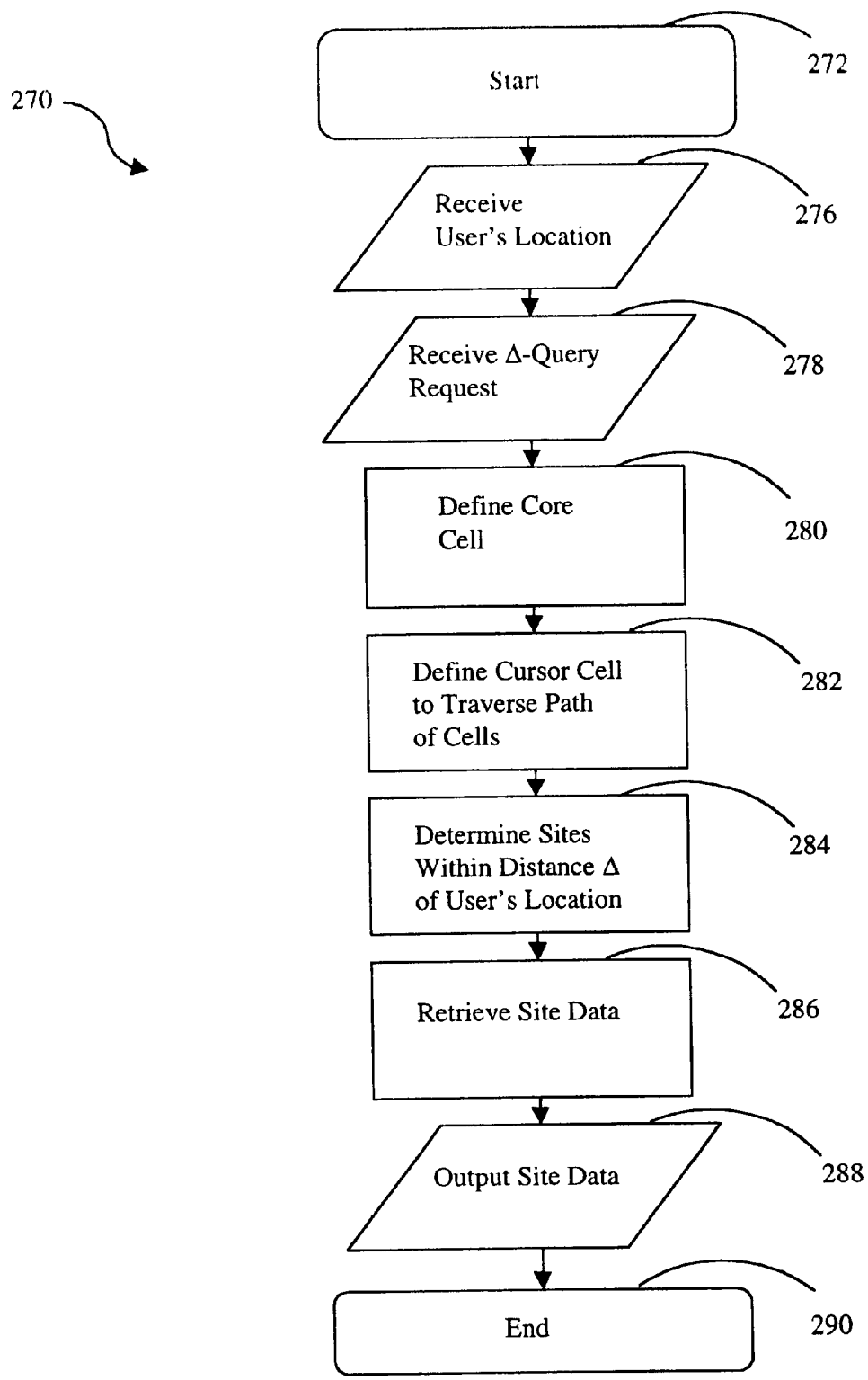
FIG. 12 is a flowchart illustrating the steps of a second method of retrieving site data in a preferred embodiment of the present invention.

FIG. 12 is a flowchart illustrating the steps of a second method of retrieving site data in a preferred embodiment of the present invention shown generally as 270. Method 270 is performed to resolve a Δ-query, described in greater detail with reference to previous figures. Further details with respect to some steps of method 270 have also been described in greater detail with reference to previous figures. Method 270 is a method of retrieving site data pertaining to one or more sites in a site set, where each site is located in a location space, and where site data pertaining to the sites is contained in a site data repository.

To perform the steps of method 270, linkcells of the present invention must already have been generated. Each linkcell will comprise a cell space in the location space, each linkcell will have at least one site associated with it, each linkcell will have been assigned a cell identifier or name, and each linkcell will be linked to a data table. Method 270 commences at step 272.

At step 276, a user's location is received. This may be as input by a user, or received from some other data source or system (e.g. a GPS system), for example.

At step 278, a user's request is received to retrieve site data pertaining to sites located within a specified distance (i.e. Δ) of said user's location. In other words, the user has posed a Δ-query.

At step 280, a core cell (e.g. 254 of FIG. 8) is defined, where the core cell is in a searchable area defined in the location space. Details on the manner in which a core cell is defined was described with reference to FIG. 8, with respect to a preferred embodiment of the invention.

At step 282, a cursor cell is defined, where the cursor cell traverses a path of cells surrounding the core cell (in a substantially outward-spiraling fashion in this embodiment of the invention) starting with the core cell, such that the following substeps are performed each time the cursor cell is positioned at a linkcell: (1) sites associated with that linkcell (of a user-specified site category, if specified) are identified, and (2) for each site identified in substep (1), its site identifier and its distance from the user's location are stored in a result table. The cursor cell traverses a path of cells in the searchable area starting with the core cell until either the cursor cell has traversed all of the searchable area or the cursor cell has traversed an area covering all points in the searchable area that are within the specified distance of the user's location. This can be accomplished, for example, by ensuring that all cells traversed by the cursor cell cover an area that encompasses a circle (where the area covered by the search is two-dimensional) centered at the user's location, and having a radius of Δ.

At step 284, sites within a distance of Δ of the user's location in the search area covered by the cursor cell at step 282 are determined from the distances stored in the result table. This could be facilitated, for example, by first sorting the sites, for which data is stored in the result table, by user-relative distance.

At step 286, site data pertaining to the sites determined at step 284 is retrieved from data tables and/or the site data repository.

At step 288, site data retrieved at step 286 is output to the user. It will be obvious to persons skilled in the art that the output may be provided in many forms to a user (e.g. as reports, in graphical format, or in tabular format). The output may also be provided as data to a different application, device, system, or processing module, for example. Step 290 marks the end of method 270.

Figure 13:
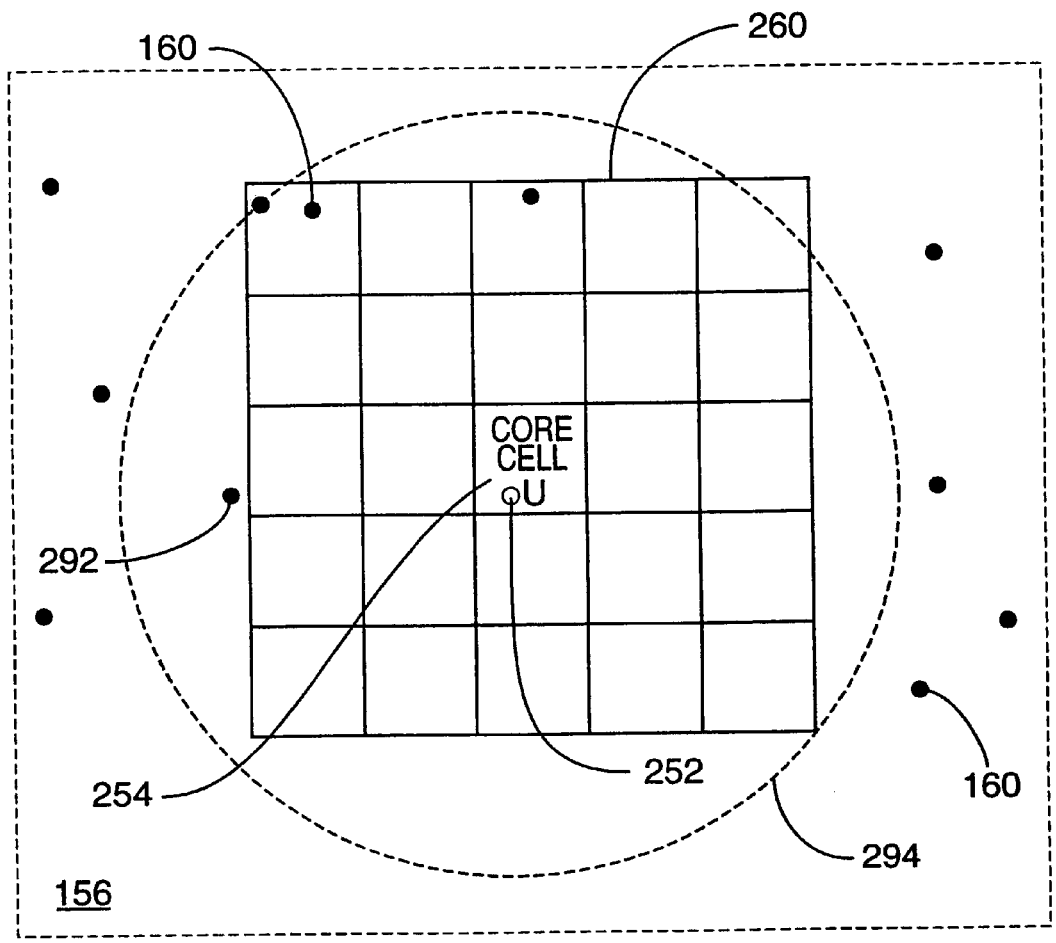
FIG. 13 is a diagram illustrating a further example of the results of an N-query.

Referring now to FIG. 13, a diagram illustrating a further example of the results of an N-query is shown. The search procedure described above (i.e. with reference to FIGS. 8 through 10), in the case of an N-query, will be continued until layers of cells containing at least N sites have been searched, or until the entire searchable area has been searched. After the search procedure is performed, the result table, when the query being processed is an N-query, will contain at least N sites (of a user-specified site category, if specified); however, the sites found may not contain the nearest N sites to the user's location 252.

FIG. 13 illustrates why the result table will contain at least N sites but that these sites are not necessarily the sites nearest to a user's location 252. As with the Δ-query, this problem also relates to the area bounded by rectangle 260 that defines the area traversed by the cursor cell as it spirals outward from the core cell. In the example of FIG. 13, the result table generated during the search procedure will contain information on N sites (where N=3 in this example) in the vicinity of the user's location 252 (labeled U); however, the result table does not include what is, in fact, the nearest site 292 in this example. This situation may be revealed by constructing a circle of position 294 centered on the user's location 252, and having a radius equal to the distance from the user's location 252 to the location of the site located furthest from the user's location 252 for which data is stored in the result table when the Nth site is encountered.

To correct for this occurrence, the greatest user-relative site distance is compared with the distance of the user's location to each of the four outer edges of the area traversed by the cursor cell. The cursor cell then conducts additional examinations of cells where the user-to-outer edge distance is less than the greatest user-relative site distance. These additional examinations continue until the distances from the user to the four outer edges of the area traversed by the cursor cell exceed the greatest user-relative site distance. Any sites found in the course of these examinations are added to the result table with, in this embodiment of the present invention, the greatest user-relative distance remaining unchanged. The sites for which data is stored in the result table are then sorted in ascending user-relative distance order, for example, to determine the nearest N sites to the user's location 252. Site data pertaining to these determined sites is then retrieved from data tables and/or the site data repository. The site data may then be outputted to a user, for example, by producing an output table of data for delivery to a client platform running an application that initiated the N-query.

Figure 14:
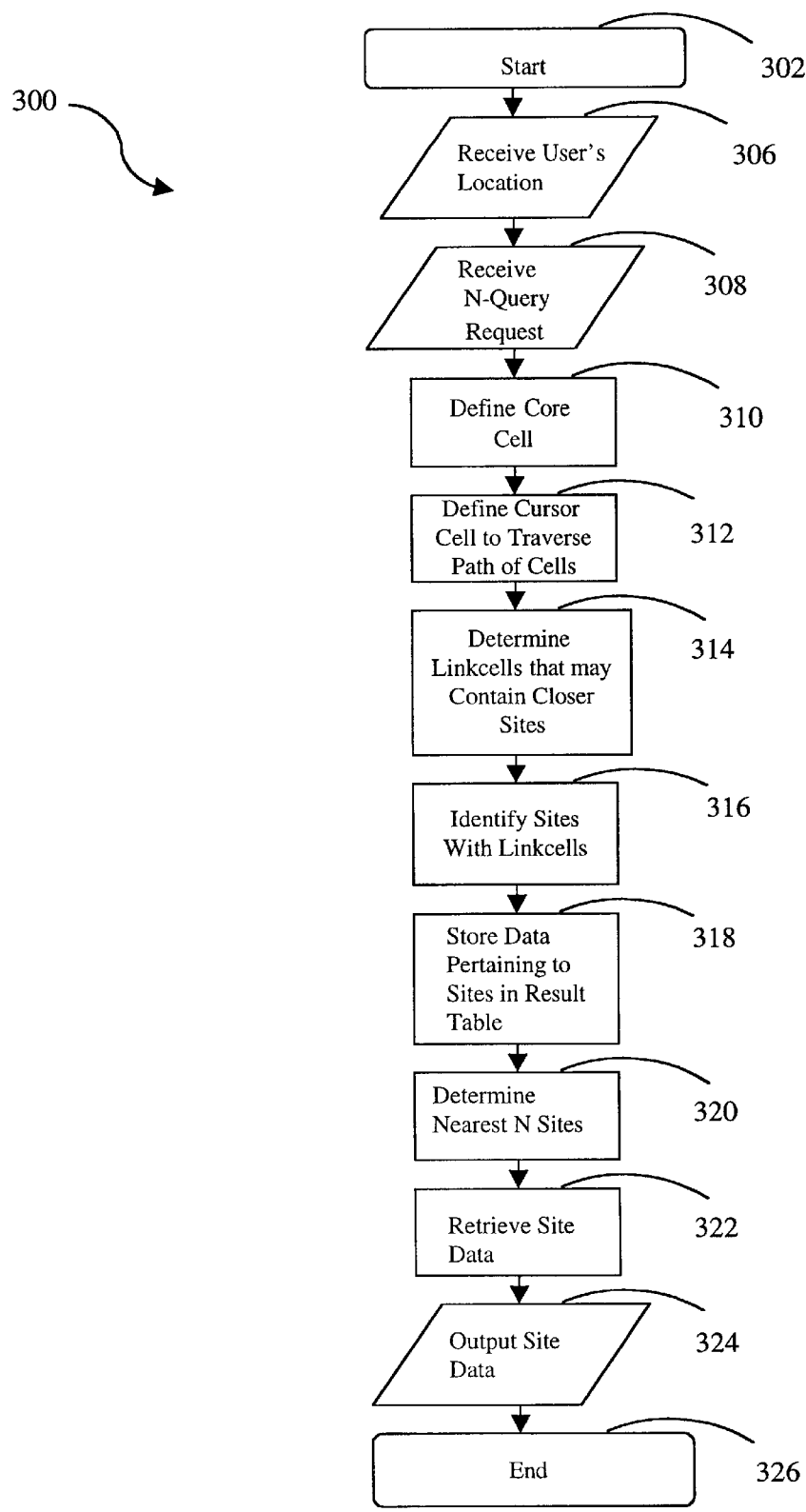
FIG. 14 is a flowchart illustrating the steps of a third method of retrieving site data in a preferred embodiment of the present invention.

FIG. 14 is a flowchart illustrating the steps of a third method of retrieving site data in a preferred embodiment of the present invention shown generally as 300. Method 300 is performed to resolve an N-query, described in greater detail with reference to previous figures. Further details with respect to some steps of method 300 have also been described in greater detail with reference to previous figures. Method 300 is a method of retrieving site data pertaining to one or more sites in a site set, where each site is located in a location space, and where site data pertaining to the sites is contained in a site data repository.

To perform the steps of method 300, linkcells of the present invention must already have been generated. Each linkcell will comprise a cell space in the location space, each linkcell will have at least one site associated with it, each linkcell will have been assigned a cell identifier or name, and each linkcell will be linked to a data table. Method 300 commences at step 302.

At step 306, a user's location is received. This may be as input by a user, or received from some other data source or system (e.g. a GPS system), for example.

At step 308, a user's request is received to retrieve site data pertaining to a specified number of sites (of a user-specified site category, if specified) closest to the user's location. In other words, the user has posed an N-query with the specified number being N.

At step 310, a core cell (e.g. 254 of FIG. 8) is defined, where the core cell is in a searchable area defined in the location space. Details on the manner in which a core cell is defined was described with reference to FIG. 8, with respect to a preferred embodiment of the invention.

At step 312, a cursor cell is defined, where the cursor cell traverses a path of cells surrounding the core cell (in a substantially outward-spiraling fashion in this embodiment of the present invention) starting with the core cell, such that the following substeps are performed each time the cursor cell is positioned at a linkcell: (1) sites associated with that linkcell (of a user-specified site category, if specified) are identified, and (2) for each site identified in substep (1), its site identifier and its distance from the user's location are stored in a result table. If the site identified in (1) is the Nth site, a greatest user-relative distance is defined, equal to the distance between the further site of the N sites and the user. The cursor cell traverses a path of cells in the searchable area starting with the core cell until either the cursor cell has traversed all of the searchable area or the cursor cell has traversed one or more predefined layers of cells containing at least the number of sites specified at step 308.

At step 314, additional linkcells in the searchable area that contain sites which could be located at a distance less than the greatest user-relative distance defined at step 312 from the user's location are determined. As was described in further detail with reference to FIG. 13, additional cells are considered that could contain sites that are closer to the user's location than the site identified at step 312 located furthest from the user's location. It is possible that a search of additional cells may not reveal any sites that are closer to the user's location than the site identified at step 312 located furthest from the user's location.

At step 316, sites associated with the additional linkcells determined at step 314 are identified, and data pertaining to the each identified site (e.g. a site identifier and a distance between the user's location and the location of the site) is stored in the result table at step 318. It is only necessary to consider a subset of sites associated with the additional linkcells, so long as the subset of sites include the sites that may be closer to the user's location than the sites for which data is already stored in the result table. Alternatively, however, the subset may consist of the complete set of sites associated with the additional linkcells, since the desired sites can be subsequently filtered at step 320.

At step 320, N sites (i.e. sites of the specified number) closest to the user's location are determined. This could be done, for example, by sorting the sites for which data is stored in the result table by user-relative distance, and retrieving the first specified number of sites in a sorted table if the sites are sorted from smallest to largest user-relative distance.

At step 322, site data pertaining to the sites determined at step 320 is retrieved from data tables and/or the site data repository.

At step 324, site data retrieved at step 322 is output to the user. It will be obvious to persons skilled in the art that the output may be provided in many forms to a user (e.g. as reports, in graphical format, or in tabular format). The output may also be provided as data to a different application, device, system, or processing module, for example. Step 326 marks the end of method 300.

Referring now to FIGS. 15A through 15E, graphs illustrating the results of a simulation that compares the performance of the present invention to that of a traditional approach of retrieving site data, using sample data. Details of the simulation methodology are provided below.

The main evaluative task with respect to the simulation described herein and performed by the inventor, is to obtain an assessment of the potential differential "speed of service" benefits that may be realized by the implementation of the present invention under a sample set of simulation criteria. In accordance with the present invention, a "location-aware" approach is used to resolve queries such as N-queries and Δ-queries in support of m-commerce transactions, instead of the traditional approach described with reference to FIG. 2. The approach is considered location-aware since the search procedure used differs depending on the location of the user and the sites of interest. One basis for comparison of the two approaches is the time required by each approach to produce output data for N-queries and Δ-queries. This time may be referred to as a resultset completion time (RCT).

The two approaches used to respond to queries were comparatively evaluated on the basis of the times taken to produce output data pertaining to query-targeted site locations from simulated site data repositories of varying size. The simulated site data repositories were constructed by generating sites with uniquely assigned site identifiers and randomly assigned horizontal coordinates, vertical coordinates, and site category codes. As each site data repository was constructed, a corresponding set of linkcells were automatically created. Average RCTs using both approaches were determined for two sample N-queries (N small and N large) and two sample Δ-queries (Δ small and Δ large) based on RCTs associated with a series of randomly generated user locations. The use of multiple user locations for each query was intended to simulate a situation in which many m-commerce users would be requesting service from a variety of user locations.

Site data repositories varied in size, associated with 1,000 to 50,000 site locations. Site locations were generated within an arbitrary region (i.e. location space) that ranged from 30° to 49.99999° north latitude and from 70° to 129.99999° west longitude. The boundaries of this region (i.e. the location space boundary sections) were used as the lower and upper vertical limits (LVL and UVL) and the right and left horizontal limits (RHL and LHL) of a searchable area, respectively. Degree units are used as the "whole number coordinate values" mentioned with reference to FIG. 5. The use of degree units in combination with the latitude and longitude location space boundary sections resulted in up to 1,200 linkcells being created during the generation of each site repository. The two N-queries seek N=3 and then N=30 site locations, while the two Δ-queries seek all sites within Δ=20 distance units and then within Δ=200 distance units. Average RCTs for the two approaches were determined from the RCTs associated with 100 randomly generated user locations. Each query associated with a user location was assigned a site category code randomly chosen from a set of 20 distinct site category code values (e.g. SC000 through SC19).

Average RCT values were then determined using the following steps: (1) A site data repository was generated along with a corresponding set of linkcells; (2) One of the four queries was selected (N-query for N=3, for example); (3) An approach was selected to respond to the query (the location-aware approach of the present invention, for example); (4) A user location was randomly generated along with an associated randomly assigned site category code; (5) The method responded to the query as if the query originated from the user location; (6) The time required by the method to produce output data in response to the query was calculated as the RCT for the user location-site category combination generated at step (4); (7) Steps (4), (5), and (6) were repeated for a total of 100 user location-site category combinations; and (8) An average RCT was calculated from the 100 RCTs associated with each user location-site category combinations.

Figure 15A:
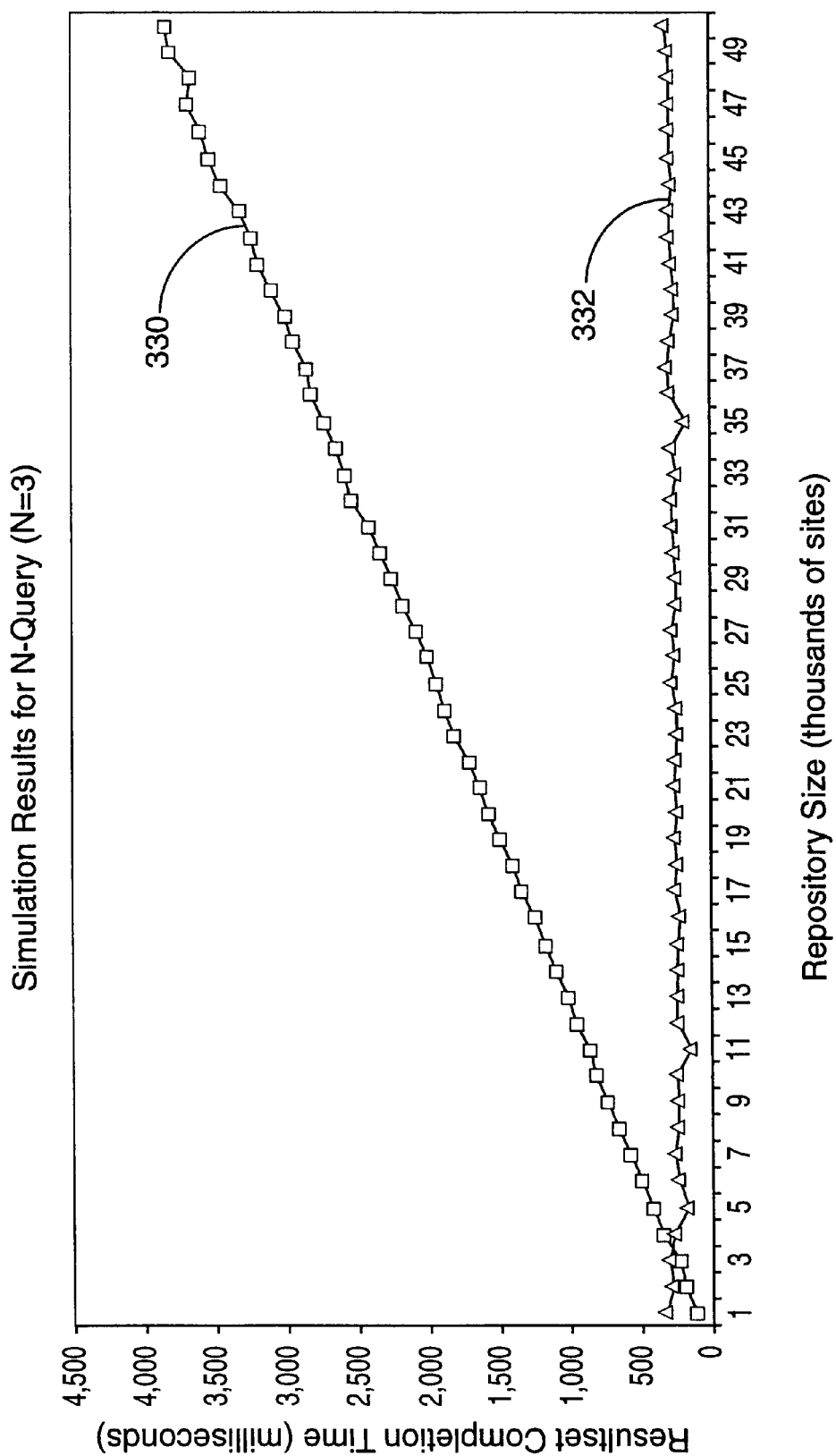
FIGS. 15A through 15E are graphs illustrating the results of a simulation that compares the performance of the present invention to the performance of a traditional approach of retrieving site data, using sample data.
Figure 15B:
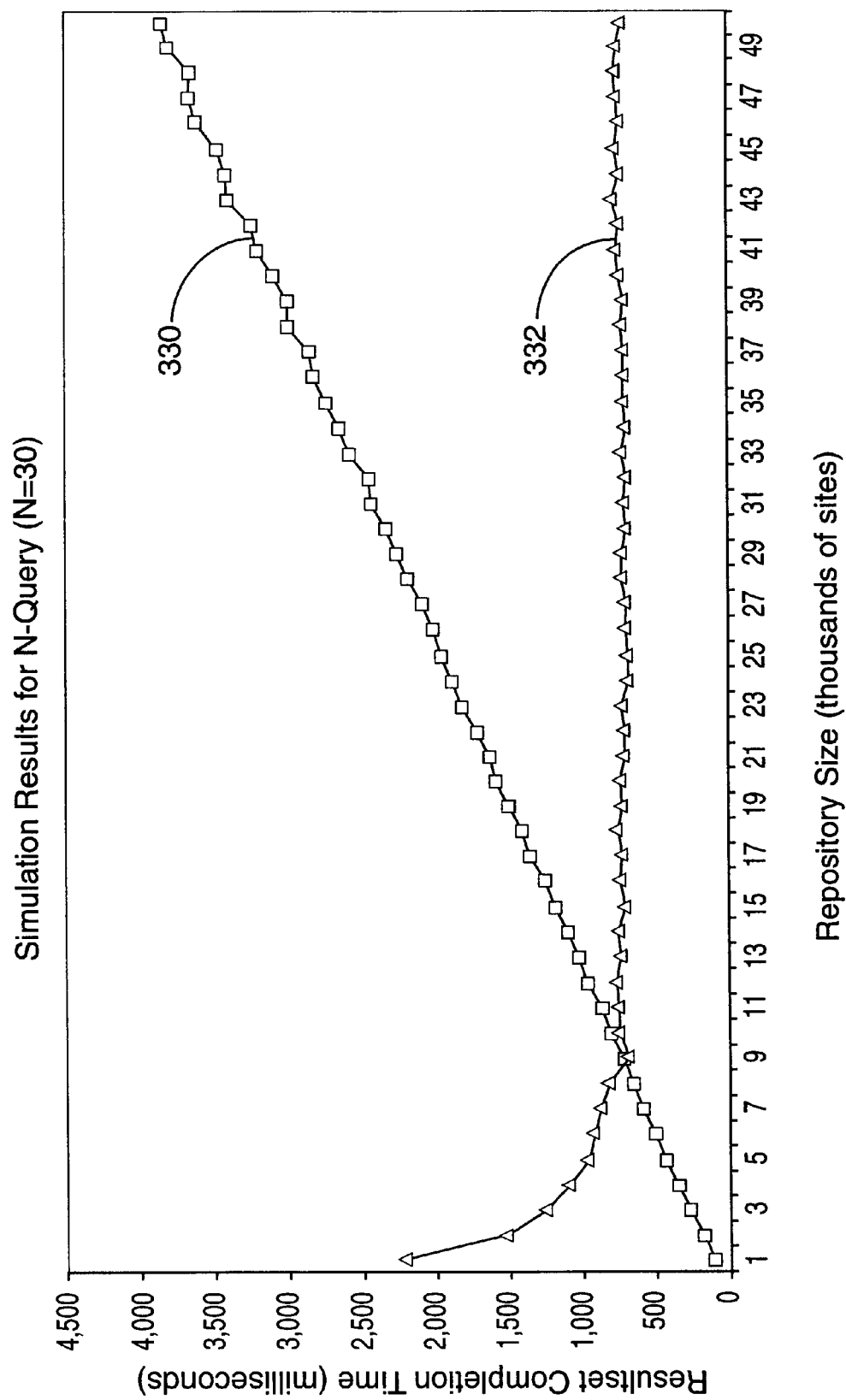
Figure 15C:
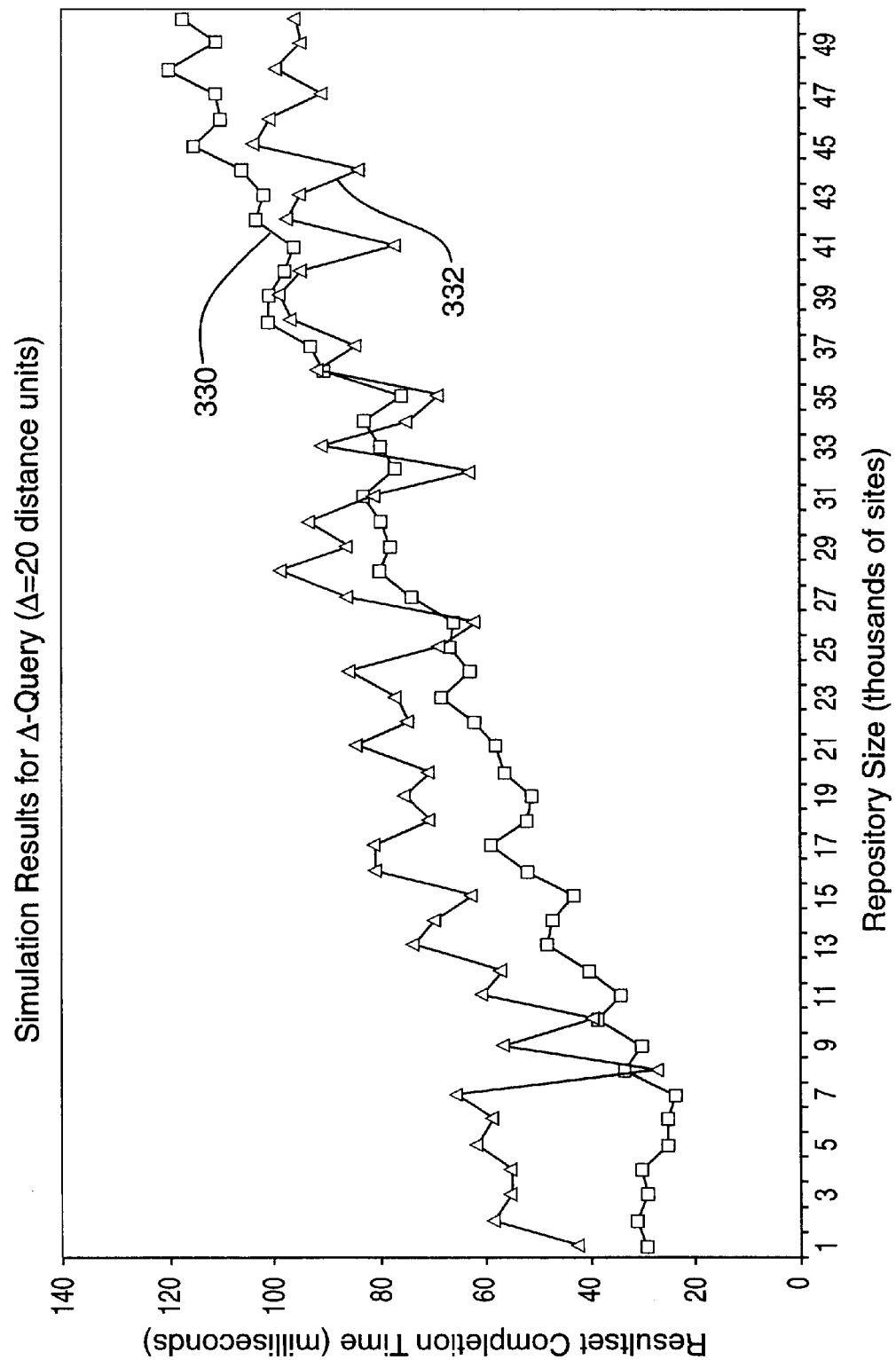
Figure 15D:
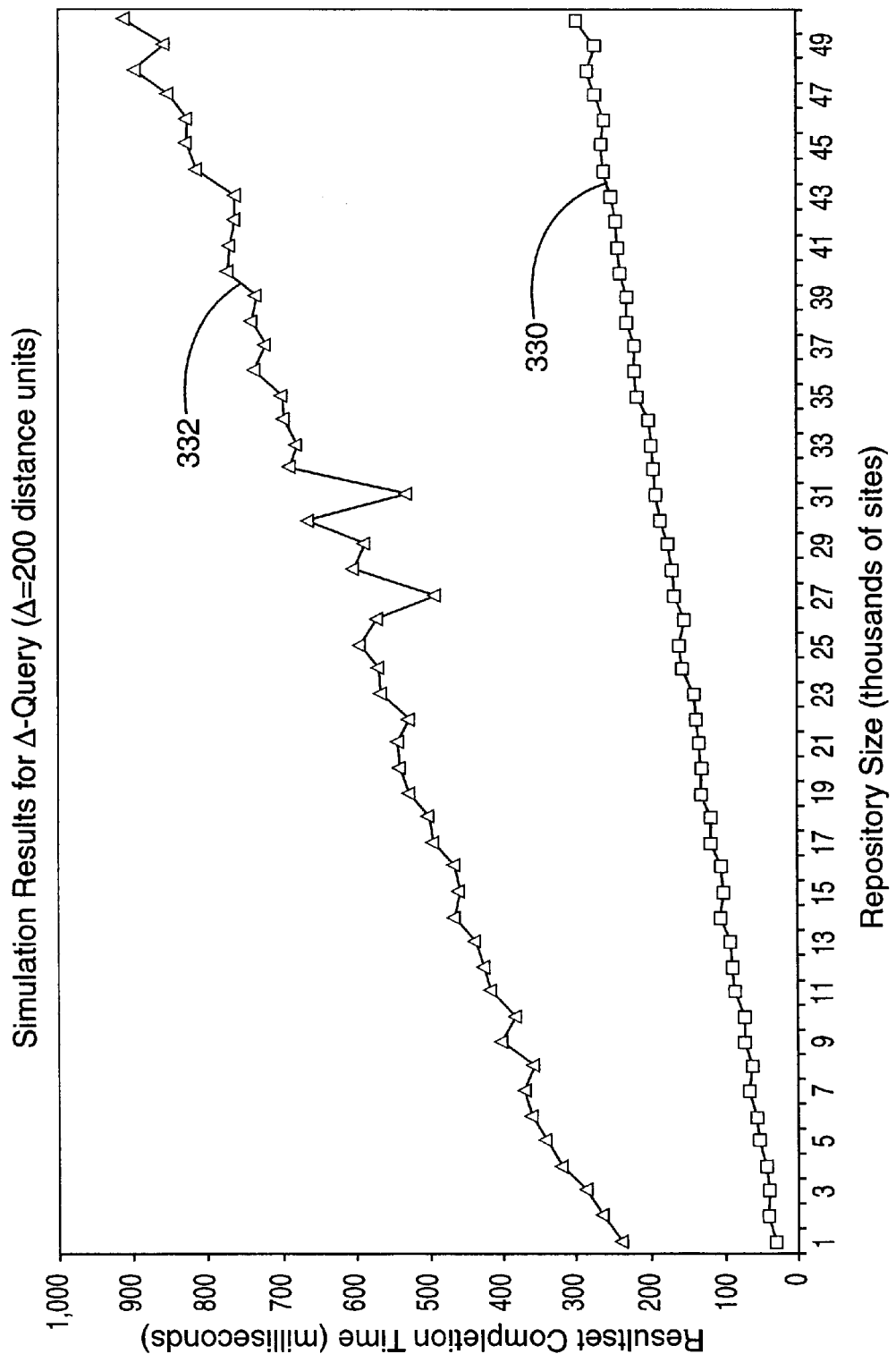
Figure 15E:
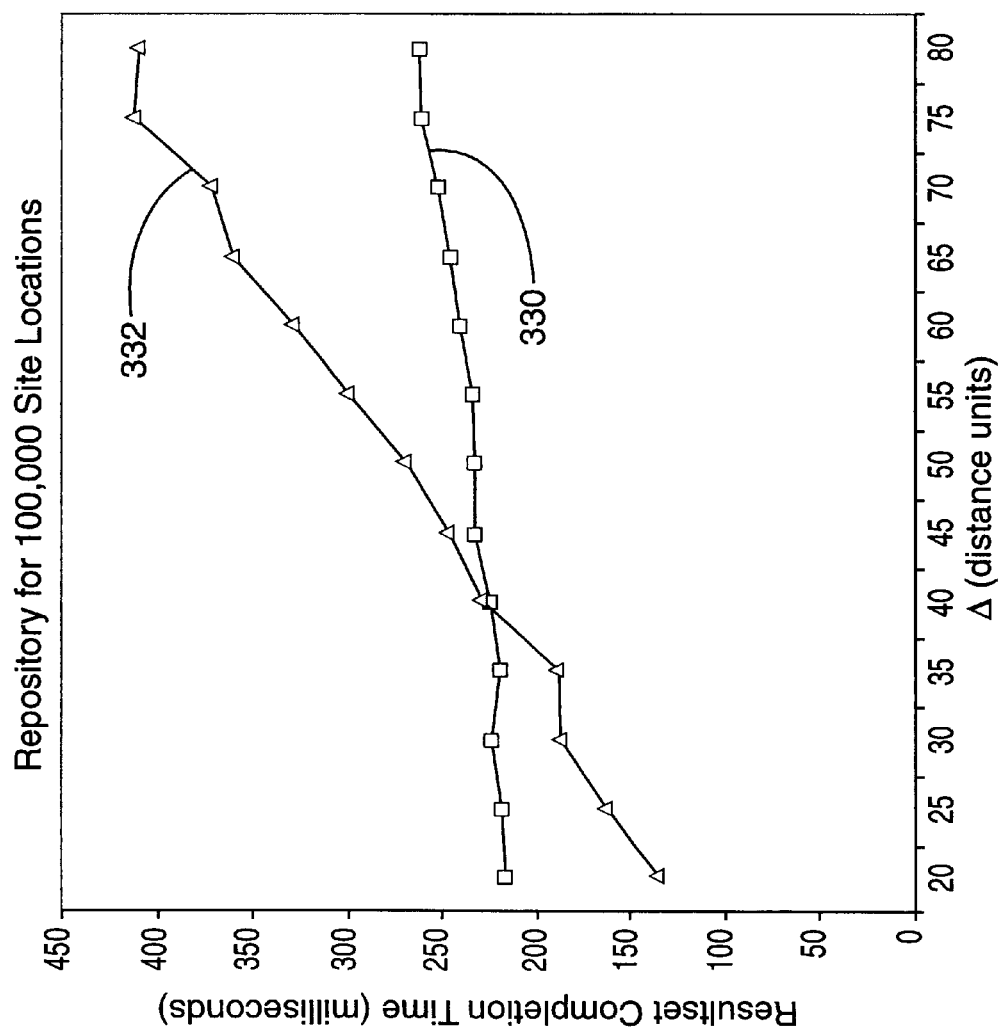

FIGS. 15A through 15D present the results graphically for the four pairs of simulations, applying each approach, associated with the queries used in the simulations. For example, FIG. 15A compares the traditional approach (marked by a first plot 330) and the location-aware approach of the present invention (marked by a second plot 332) for the small-N N-query, while similarly, FIG. 15B makes the same comparison for the large-N N-query. FIGS. 15C and 15D show comparisons of the two approaches, comparing the traditional approach (marked by a first plot 330) and the location-aware approach of the present invention (marked by a second plot 332), for the small-Δ and large-Δ Δ-Queries, respectively.

Referring to the graph of FIG. 15A, which compares the RCT averages observed for the two approaches, for site data repositories ranging in size from 1,000 to 50,000 site locations and for an N-query seeking 3 site locations, appears to indicate that as the site data repository size increases the RCT of the traditional approach also increases. This may result from the increased number of sites that must be processed as the repository is increased in size. The RCT of the location-aware approach of the present invention appears to be relatively independent of site data repository size whenever a fixed number of site locations is sought by a query (e.g. for an N-query). This may arise since only sites in the vicinity of user's location need to be examined, and also from the relative constancy in the quantity of output data generated, because a fixed number of sites is being sought.

It appears from FIG. 15A, that the traditional approach (marked by a first plot 330) provided faster query service when a site data repository contains data pertaining to fewer than 3,000 site locations (in the simulation environment used for this simulation), while the location-aware approach of the present invention (marked by a second plot 332) provided faster query service for repositories with greater than 3,000 site locations (in the simulation environment used for this simulation). Further, the general trend of the plots suggest that the location-aware approach of the present invention would continue to dominate the traditional approach as the site data repository grows in size.

FIG. 15B indicates similar results for an N-query where N=30, where it appears that the traditional approach (marked by a first plot 330) provided faster query service when a site data repository contains data pertaining to fewer than 9,000 site locations (in the simulation environment used for this simulation), while the location-aware approach of the present invention (marked by a second plot 332) provided faster query service for repositories with greater than 9,000 site locations (in the simulation environment used for this simulation). Advantageously, it is clear that the location-aware approach used to respond to N-queries in accordance with the present invention is less time consuming than the traditional approach, at least for some queries, some sizes of site data repositories, and some values of N.

Referring to the graph of FIG. 15C, the RCT averages observed for the traditional approach (marked by a first plot 330) are compared with those observed for the location-aware approach of the present invention (marked by a second plot 332), for a Δ-query seeking all sites in the user-selected site category that are within 20 distance units of the user's location. It appears that the RCT for the location-aware approach of the present invention, when responding to a Δ-query, tends to increase with site data repository size. FIG. 15C appears to indicate that there are sizes of site data repositories when the location-aware approach of the present invention is more efficient than the traditional approach. FIG. 15D appears to indicate that the location-aware approach of the present invention (marked by a second plot 332) is less efficient than the traditional approach (marked by a first plot 330) when responding to Δ-queries when Δ is equal to 200 distance units, for the specific linkcell size used in the simulation. However, FIG. 15E appears to indicate that the location-aware approach of the present invention (marked by a second plot 332) is more efficient than the traditional approach (marked by a first plot 330) for some smaller values of Δ. While other simulations performed using different simulation criteria and sample data may produce different results, in any event, it is clear that the location-aware approach used to respond to Δ-queries in accordance with the present invention is less time consuming than the traditional approach, at least for some queries, some sizes of site data repositories, and some values of Δ.

Although discussed above as separate methods that may be performed in preferred embodiments of the present invention, the methods of the present invention may be implemented in an integrated process when searching a site data repository in response to an N-query or a Δ-query. Linkcell name extraction, cursor cell path determination, horizontal and vertical limits detection, linkcell examination, result table data accumulation, and other actions may all take place in a concurrent and dynamic manner, as the cursor cell "moves" in search of query-targeted sites. The use of an integrated relational database environment to construct and implement the present invention, for example, may facilitate the integration of the various features of the present invention, and can permit the use of relational concepts in the implementation of the invention, by using relational tables to represent linkcells for instance.

In variant embodiments of the invention, system 50 may facilitate the determination of whether the location-aware approach of the present invention or a traditional approach (e.g. as described with reference to FIG. 2) in responding to a query is likely to be more efficient, given a particular query type, site data repository size, or some other value. System 50 may also be designed to retrieve site data from a site data repository in resolving a query using the approach (e.g. chosen dynamically) that it determines is likely to be more efficient.

In variant embodiments of the present invention, a site need not be contained in a linkcell or cell to be associated with that linkcell or cell. In these embodiments, a mapping scheme or other scheme may be used to map a site located outside the linkcell or cell onto that linkcell or cell.

In variant embodiments of the present invention, site data in a site data repository may be pre-filtered for a particular application before linkcells are generated in accordance with the present invention. For example, it may be advantageous to pre-filter the site data such that only site data pertaining to sites of a specified site category relevant to a particular application is considered, where the user would only be interested in sites of that site category. In this embodiment, pre-filtering the site data repository may make the resolution of a query more efficient in such cases, since it is not necessary to check the site category of each site located in the process of resolving the query.

In variant embodiments of the present invention, it will be obvious to those skilled in the art that there are numerous possible configurations of the user interface 70 and system 50. The user interface 70 and system 50 can be modified by an implementer of the present invention in different ways for different applications, uses or devices, including portable and/or wireless devices for example, without departing from the present invention. Caching techniques may also be employed to speed up the process of data retrieval by components of system 50. Means to control the functions of system 50 that are available to particular users (e.g. setting permissions for different levels of users) may also be used.

In variant embodiments of the present invention, different configurations may be used in a web-based implementation of the invention. Modifications to system 50 to permit secure access to information may also be made in known manner. Firewalls may also be implemented in system 50 to prevent unauthorized access to private information.

With respect to elements of system 50, it will be apparent to those skilled in the art that the execution of various tasks associated with the present invention need not be performed by the particular component specified in the description of the preferred and variant embodiments of the invention. For example, it will be obvious to those skilled in the art that the performance of tasks by processing modules 80 may be performed by a single module or by several modules, which may or may not be associated with a single application, and which may be different from any of the processing modules described herein.

Furthermore, it will also be obvious to those skilled in the art that the information stored in system databases 60 may be distributed across multiple storage means, and that components of system 50 can also be distributed across several devices, machines, and/or storage means.

The present invention has been described with regard to preferred embodiments. However, it will be obvious to persons skilled in the art that a number of variants and modifications can be made without departing from the scope of the invention as described herein.

What is claimed is:

1. A method of retrieving site data pertaining to one or more sites of a plurality of sites in a site set, wherein each site in said site set is located in a location space, wherein said location space is partitioned into cells so that each site in said site set is associated with exactly one cell, wherein site data pertaining to sites in said site set is contained in a site data repository, wherein said site data comprises a site identifier for each site, and wherein said method comprises the steps of:

(a) generating at least one linkcell, each linkcell being a cell having at least one site associated therewith, wherein the location of each site in said location space is defined by one or more coordinates, wherein a cell identifier derived from said coordinates is assigned to each linkcell such that each cell identifier uniquely identifies the linkcell with which a site in said site set is associated from the location of the site, and wherein each linkcell is linked to at least one data table for storing site identifiers of sites associated with said linkcell;

(b) receiving a user's location;

(c) receiving a user request to retrieve site data pertaining to a specified number of sites closest to said user's location;

(d) defining a core cell, wherein said core cell is in a searchable area defined in said location space;

(e) defining a cursor cell, wherein said cursor cell traverses a path of cells in said searchable area starting with said core cell until either said cursor cell has traversed all of said searchable area or said cursor cell has traversed one or more predefined layers of cells containing at least the specified number of sites, and wherein the following substeps are performed:
  (1) deriving a cell identifier for each cell in said path traversed by said cursor cell, determining if there exists a linkcell to which the respective derived cell identifier has been assigned, and where so determined, identifying sites associated with that linkcell from the site identifiers stored in one or more data tables linked thereto, and
  (2) for each site identified in substep (1), determining storing the site identifier therefor and the distance between the user's location and the identified site and storing the site identifier therefor and said determined distance in a result table;
(f) determining any additional linkcells in said searchable area that could have sites associated therewith that are closer to the user's location than any of the sites identified in step (e);
(g) identifying sites associated with said any additional linkcells;
(h) for each site associated with said any additional linkcells, determining the distance between the user's location and said site and storing the site identifier therefor and said determined distance in a said result table;
(i) determining the specified number of sites closest to said user's location from the distances stored in said result table;
(j) retrieving site data pertaining to the specified number of sites closest to said user's location determined in step (i); and
(k) outputting site data retrieved in step (j)to a user.

2. The method of retrieving site data pertaining to one or more sites of a plurality of sites in a site set as claimed in claim 1, wherein in step (e), said cursor cell traverses a path of cells in one of the following manners: in a substantially outward-spiraling clockwise direction starting with said core cell; in a substantially outward-spiraling counterclockwise direction starting with said core cell; in a predefined manner starting with said core cell.

3. The method of retrieving site data pertaining to one or more sites of a plurality of sites in a site set as claimed in claim 1, wherein in step (e), cells of said path must be located in said searchable area defined in said location space.

4. The method of retrieving site data pertaining to one or more sites of a plurality of sites in a site set as claimed in claim 1, wherein said core cell is defined in step (d) as the cell containing said user's location unless said user's location is outside said searchable area, in which case said core cell is defined as the cell in said searchable area that is closest to said user's location.

5. The method of retrieving site data pertaining to one or more sites of a plurality of sites in a site set as claimed in claim 1, wherein site data retrieved in step (j) is retrieved from data tables linked to the linkcells that are associated with the specified number of sites closest to said user's location determined in step (i).

6. The method of retrieving site data pertaining to one or more sites of a plurality of sites in a site set as claimed in claim 1, wherein site data retrieved in step (j) is retrieved from said site data repository using links in the data tables linked to the linkcells that are associated with the specified number of sites closest to said user's location determined in step (i).

7. The method of retrieving site data pertaining to one or more sites of a plurality of sites in a site set as claimed in claim 1, wherein said cell space is defined by a cell perimeter that comprises one or more cell boundary sections, and wherein each of said one or more cell boundary sections has a predefined coordinate interval associated therewith.

8. The method of retrieving site data pertaining to one or more sites of a plurality of sites in a site set as claimed in claim 1, wherein the location of a site is defined by at least two coordinates.

9. The method of retrieving site data pertaining to one or more sites of a plurality of sites in a site set as claimed in claim 8, wherein a cell identifier is derived from said at least two coordinates, said at least two coordinates defining the location of a site of the sites associated with the linkcell to which said cell identifier has been assigned.

10. The method of retrieving site data pertaining to one or more sites of a plurality of sites in a site set as claimed in claim 8, wherein the each cell identifier is a name composed of a plurality of components, wherein each component of said plurality of components is associated with a coordinate of said at least two coordinates.

11. The method of retrieving site data pertaining to one or more sites of a plurality of sites in a site set as claimed in claim 10, wherein each component is equal to the value of the coordinate associated therewith truncated to a nearest predefined coordinate interval.

12. The method of retrieving site data pertaining to one or more sites of a plurality of sites in a site set as claimed in claim 10, wherein each component is equal to the value of the coordinate associated therewith truncated to a nearest predefined coordinate interval multiplied by a scaling factor.

13. The method of retrieving site data pertaining to one or more sites of a plurality of sites in a site set as claimed in claim 1, wherein any site identified in steps (e) and (g) must have site data pertaining thereto that comprises a user-specified site category identifier.

14. A system for retrieving site data pertaining to one or more sites of a plurality of sites in a site set, wherein each site in said site set is located in a location space, wherein said location space is partitioned into cells wherein site data pertaining to sites in said site set comprises a site identifier for each site, said system comprising:
  (a) a site data repository, wherein site data pertaining to sites in said site set is contained in said site data repository;
  (b) a storage means for storing data tables;
  (c) a user interface; and
  (d) one or more processing modules connected to said site data repository, said storage means, and said user interface, wherein said one or more processing modules are programmed to perform the steps of the method of retrieving site data pertaining to one or more sites of a plurality of sites in a site set as claimed in claim 1.

15. The method of retrieving site data pertaining to one or more sites of a plurality of sites in a site set as claimed in claim 1, wherein each data table has a name derived from the cell identifier of the linkcell linked thereto.

16. The method of retrieving site data pertaining to one or more sites of a plurality of sites in a site set as claimed in claim 1, wherein in determining the distance between the user's location and an identified site in step (e), the location of the identified site is retrieved from data stored in the site data repository.

17. The method of retrieving site data pertaining to one or more sites of a plurality of sites in a site set as claimed in claim 1, wherein in determining the distance between the user's location and an identified site in step (e), the location of the identified site is retrieved from data stored in a data table.

* * * * *